US012607971B2

(12) United States Patent
Davis et al.

(10) Patent No.:    US 12,607,971 B2
(45) Date of Patent:        Apr. 21, 2026

(54) MACHINE LEARNING-BASED SYSTEMS FOR PARAMETER DEVIATION MONITORING AND ALERTING IN ENGINES AND PUMP CONTROLS

(71) Applicant: Cattron North America, Inc., Warren, OH (US)

(72) Inventors: Brett Allen Davis, Roswell, GA (US); John Edward Geertsema, Jr., Roswell, GA (US); Christopher Brian Perry, Roswell, GA (US)

(73) Assignee: Cattron North America, Inc., Warren, OH (US)

( * ) Notice: Subject to any disclaimer, the term of this patent is extended or adjusted under 35 U.S.C. 154(b) by 405 days.

(21) Appl. No.: 18/220,686

(22) Filed: Jul. 11, 2023

(65) Prior Publication Data

US 2024/0019816 A1    Jan. 18, 2024

Related U.S. Application Data

(63) Continuation of application No. PCT/US2023/027397, filed on Jul. 11, 2023.

(Continued)

(51) Int. Cl.
G05B 13/02          (2006.01)

(52) U.S. Cl.
CPC ................................ G05B 13/0265 (2013.01)

(58) Field of Classification Search
CPC ..... G05B 13/0265; F02D 41/22; F02D 29/04; F02D 31/00; F02D 41/2451; G06N 20/00;

(Continued)

(56) References Cited

U.S. PATENT DOCUMENTS

2015/0300287 A1    10/2015  Ulrey et al.
2019/0316447 A1*  10/2019  Oehring ................ F04B 49/065

(Continued)

FOREIGN PATENT DOCUMENTS

CN          111130418 A       5/2020
DE      102015206740 A1    10/2015

(Continued)

OTHER PUBLICATIONS

CANplus CP1000; Cattron Control Panel Operation Manual; Dec. 2019; 59 pages.

(Continued)

*Primary Examiner* — Jigneshkumar C Patel
(74) *Attorney, Agent, or Firm* — Harness, Dickey & Pierce, P.L.C.; Anthony G. Fussner

(57)                          ABSTRACT

Exemplary embodiments are disclosed of controllers with machine learning and systems including the same. In exemplary embodiments, a controller is configured to include or be operable for executing a machine learning process during which the controller learns normal level(s) of parameter(s) (e.g., system component(s) and/or sensor(s) parameters, etc.) to be monitored across a full operational range of a system component, which, in turn, enables the controller to compare the monitored parameter(s) to the learned normal level(s) for detection of issue(s) or problem(s) associated with the monitored parameter(s), e.g., regardless of the RPM at which the engine, machine, motor, or other system component is operating, etc.

26 Claims, 11 Drawing Sheets

Related U.S. Application Data

(60) Provisional application No. 63/396,136, filed on Aug. 8, 2022, provisional application No. 63/389,798, filed on Jul. 15, 2022, provisional application No. 63/388,504, filed on Jul. 12, 2022.

(58) Field of Classification Search
CPC . H02P 21/0025; H02P 23/0031; H02P 29/024
USPC .......................................................... 700/28
See application file for complete search history.

(56) References Cited

U.S. PATENT DOCUMENTS

| | | | | |
|---|---|---|---|---|
| 2019/0323335 | A1* | 10/2019 | Ocegueda-Hernandez | ................. E21B 44/04 |
| 2020/0153348 | A1* | 5/2020 | Woodley | ................. H02M 1/32 |
| 2021/0081823 | A1 | 3/2021 | Boguslawski et al. | |
| 2022/0090485 | A1 | 3/2022 | Boguslawski et al. | |

FOREIGN PATENT DOCUMENTS

| | | |
|---|---|---|
| WO | WO-2007008940 A2 | 1/2007 |
| WO | WO-2019209766 A1 | 10/2019 |

OTHER PUBLICATIONS

International Search Report and Written Opinion for PCT/US2023/027397 that is the parent application to the instant application; Oct. 27, 2023; 9 pages.

Extended European Search Report for EP23840222.6 that claims priority to the same parent application as the instant application; dated Sep. 12, 2025; 10 pages.

* cited by examiner

| Warning Alarm | --DEV-- |
|---|---|
| Armed When | Never |
| Engine Condition | Running |
| Eng Stop | Ignore |
| Warning Threshold | 5 % |
| Running Ignore Delay s | 10 |
| Enable Delay s | 5 |
| Disable Delay s | 5 |
| Data Loss Fault | Off |

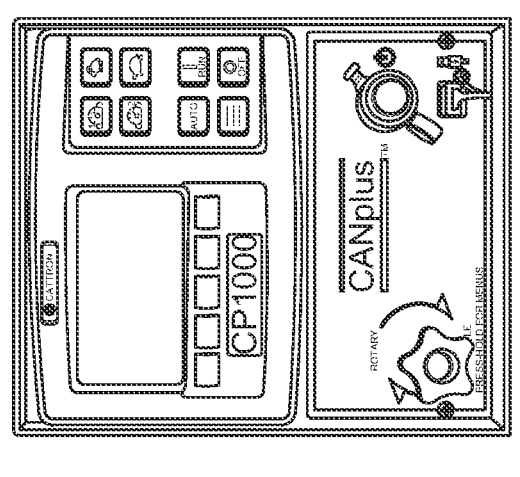
904
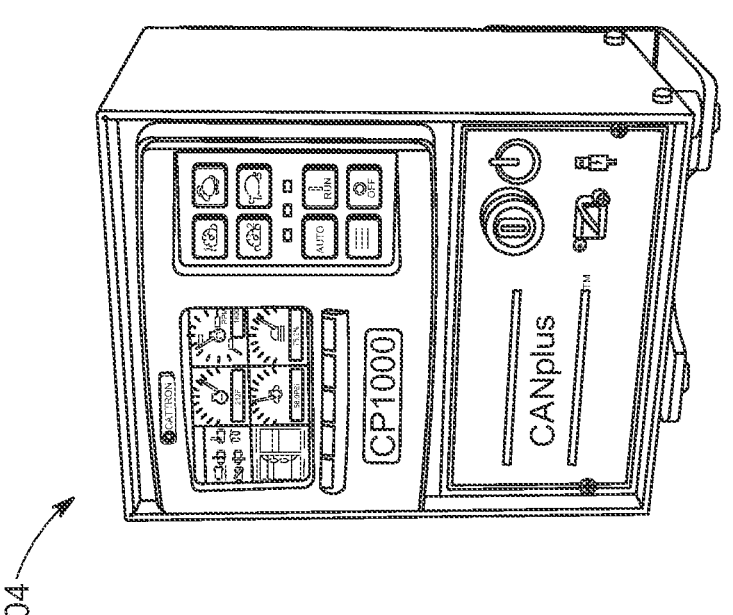
904
FIG. 9
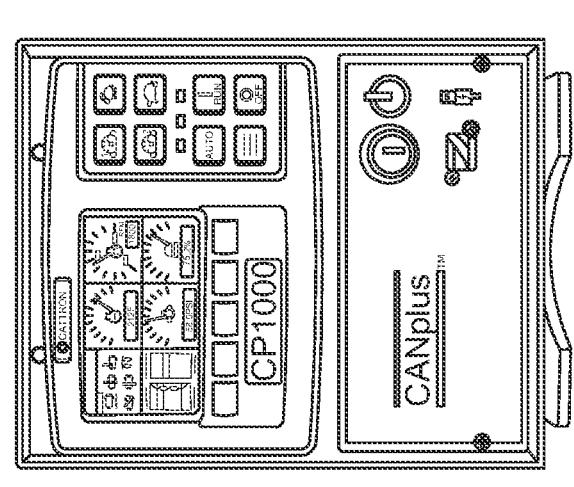
904

| Icon | Description |
|---|---|
| | Pump Flow |
| | Pump suction (flow arrow on the suction side of the pump) |
| | Pump Discharge (flow arrow on the discharge side of the pump) |
| | Pump Delta Pressure (flow arrow on suction and discharge sides of the pump) |
| | Engine Fuel Rate |
| | Engine Load Torque |
| | VFD Percent Load |
| | VFD Power Factor Angle |
| | VFD Output Current |
| | VFD Torque |

FIG. 10

-3.50 inHG 12.1 PSI 2.61 PSI 2.70 PSI

MACHINE LEARNING-BASED SYSTEMS FOR PARAMETER DEVIATION MONITORING AND ALERTING IN ENGINES AND PUMP CONTROLS

CROSS-REFERENCE TO RELATED APPLICATIONS

This application is a continuation application of PCT International Patent Application Number PCT/US23/27397 filed Jul. 11, 2023. Both this application and the PCT International Patent Application Number PCT/US23/27397 claim the benefit of and priority to:

(1) U.S. Provisional Patent Application Ser. No. 63/388,504 filed Jul. 12, 2022;

(2) U.S. Provisional Patent Application Ser. No. 63/389,798 filed Jul. 15, 2022; and (3) U.S. Provisional Patent Application Ser. No. 63/396,136 filed Aug. 8, 2022. The entire disclosures of these provisional patent applications are incorporated herein by reference.

FIELD

The present disclosure generally relates to controllers (e.g., control panels, etc.) with machine learning and systems including such machine-learning controllers.

BACKGROUND

This section provides background information related to the present disclosure which is not necessarily prior art.

Control panels are commonly used for controlling operation of engines, motors, and machines. This includes monitoring numerous parameters such as oil pressure, water pressure, engine torque, engine fuel consumption, water flow, vibration, etc.

DRAWINGS

The drawings described herein are for illustrative purposes only of selected embodiments and not all possible implementations and are not intended to limit the scope of the present disclosure.

FIG. 1 illustrates an exemplary embodiment of a system that includes a machine-learning controller configured to be operable for controlling an engine, which, in turn, is operable for driving a pump. The controller is configured to include or be operable for executing a machine learning process during which the controller learns (e.g., algorithmically learns via artificial intelligence (AI) machine learning algorithm(s), etc.) normal level(s) of the engine and/or sensor(s) parameter(s) to be monitored across a full operational range of the engine, which, in turn, enables the controller to compare the monitored parameter(s) of the engine and/or sensor(s) to the normal level(s) for detection of problem(s) regardless of the RPM at which the engine is operating.

FIG. 2 illustrates an exemplary embodiment of a system that includes a machine-learning controller configured to be operable for controlling a variable frequency drive (VFD) and a motor, which, in turn, is operable for driving (e.g., mechanically spinning, etc.) a pump. The controller is configured to include or be operable for executing a machine learning process during which the controller learns (e.g., algorithmically learns via artificial intelligence (AI) machine learning algorithm(s), etc.) normal level(s) of the motor and/or sensor(s) parameter(s) to be monitored across a full operational range of the motor, which, in turn, enables the controller to compare the monitored parameter(s) of the motor and/or sensor(s) to the normal level(s) for detection of problem(s) regardless of the RPM at which the motor is operating.

FIG. 3 illustrates an exemplary embodiment of a system that includes first and second machine-learning controllers configured to be operable for respectively controlling a motor and an engine, which, in turn, are respectively operable for driving (e.g., mechanically spinning, etc.) first and second pumps. The first controller is configured to include or be operable for executing a machine learning process during which the first controller learns (e.g., algorithmically learns via artificial intelligence (AI) machine learning algorithm(s), etc.) normal level(s) of the engine and/or sensor(s) parameter (s) to be monitored across a full operational range of the engine, which, in turn, enables the first controller to compare the monitored parameter(s) of the engine and/or sensor(s) to the normal level(s) for detection of problem(s) regardless of the RPM at which the engine is operating. The second controller is configured to include or be operable for executing a machine learning process during which the second controller learns (e.g., algorithmically learns via artificial intelligence (AI) machine learning algorithm(s), etc.) normal level(s) of the motor and/or sensor(s) parameter(s) to be monitored across a full operational range of the motor, which, in turn, enables the second controller to compare the monitored parameter(s) of the motor and/or sensor(s) to the normal level(s) for detection of problem(s) regardless of the RPM at which the motor is operating.

FIG. 4 illustrates an exemplary embodiment of a system including a machine-learning controller configured to be operable for controlling an engine, a variable frequency drive (VFD), and a motor. The engine and the motor are respectively operable for driving (e.g., mechanically spinning, etc.) first and second pumps. The controller is configured to include or be operable for executing a machine learning process during which the controller learns (e.g., algorithmically learns via artificial intelligence (AI) machine learning algorithm(s), etc.) normal level(s) of the motor, engine, and/or sensor(s) parameters to be monitored across full operational ranges of the motor and engine, which, in turn, enables the controller to compare the monitored parameter(s) of the motor, engine, and/or sensor(s) to the normal level(s) for detection of problem(s) regardless of the RPMs at which the engine and motor are respectively operating.

FIG. 5 illustrates a flowchart of an exemplary method in which a controller learns (e.g., algorithmically learns via artificial intelligence (AI) machine learning algorithm(s), etc.) normal level(s) of parameter(s) of system component(s) and/or sensor(s) to be monitored across a full operational range (e.g., full RPM range of an engine, machine, motor, etc.) of the system component(s) and thereafter compares the monitored parameter(s) of the system component(s) and/or sensor(s) to the normal level(s) for detection of problem(s).

Figure 1:
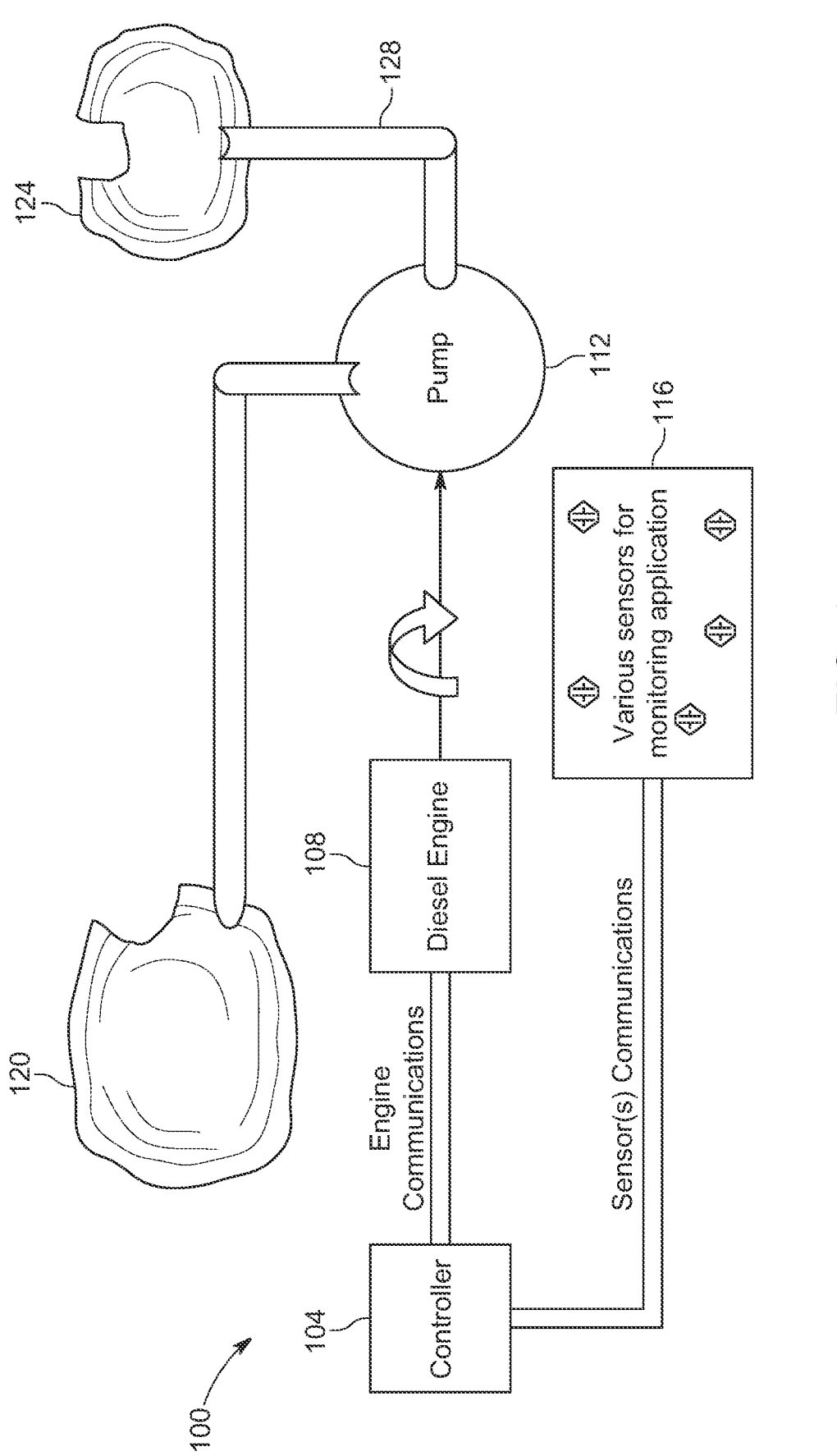

FIG. 9 shows an example CANplus™ CP1000 control panel that may be configured (e.g., algorithmically configured via artificial intelligence (AI) machine learning algorithm(s), provided with application programming or software, etc.) to be operable for executing a machine learning process during which the control panel learns normal level(s) of system component(s) and/or sensor(s) parameter(s) across a full operational range (e.g., full RPM range of an engine, machine, motor, etc.) of the system component(s), which, in turn, enables the control panel to compare the monitored parameter(s) of the system component(s) and/or sensor(s) to the normal level(s) for detection of problem(s), e.g., regardless of the RPM at which the system component(s) is operating.

FIG. 10 is a table showing example icons that may be used with gauges of a control panel according to exemplary embodiments disclosed herein.

FIGS. 11, 12, 13, and 14 show icons that may be used with gauges of a control panel according to exemplary embodiments.

Corresponding reference numerals may indicate corresponding (though not necessarily identical) parts throughout the several views of the drawings.

DETAILED DESCRIPTION

Example embodiments will now be described more fully with reference to the accompanying drawings.

Control panels are commonly used for controlling operation of engines, motors, and machines (broadly, system components). This includes monitoring numerous parameters, such as oil pressure, water pressure, engine torque, engine fuel consumption, water flow, vibration, other engine/machine operating parameters, etc. Many parameters, however, change as the RPMs (revolutions per minute) change. Parameters may also change depending on the particular day's application setup.

As recognized herein, however, the changing parameters may render a single fault level too broad to detect smaller changes in a parameter(s) that could indicate a problem or fault with the engine, motor, machine, etc. For example, oil pressure varies by RPM. Conventionally, warnings/faults for oil pressure are set to a low enough level to accommodate when the engine is at idle and the oil pressure is normally low. But that low oil pressure warning/fault level may be insufficient at a much higher RPM. And even if the oil pressure fault/warning level is not too low at a higher RPM, it could indicate a potential problem if it is much lower than the "normal" value at the higher RPM.

Another example is pumping discharge pressure that include a too high discharge pressure warning/fault and a too low discharge pressure warning/fault. Conventionally the discharge pressure warnings are typically estimated to cover the possible extremes like a truck parking on a hose and closing it down completely when the machine is at full RPM. But it is possible at lower RPMs that the discharge pressure level selected was too high such that no warning or fault was generated even though a problem exists.

After recognizing the above, exemplary embodiments of controllers (e.g., control panels, etc.) with machine learning were developed and/or are disclosed herein. In exemplary embodiments disclosed herein, a controller is configured to include or be operable for executing a machine learning process during which the controller learns (e.g., algorithmically learns via artificial intelligence (AI) machine learning algorithm(s), etc.) normal level(s) of system component(s) and/or sensor(s) parameter(s) being monitored across a full operational range of the system component. The normal level(s) established via the machine learning process enables the controller to compare the monitored parameter(s) of the system component(s) and/or sensor(s) to the normal level(s) for detection of problem(s), e.g., regardless of the RPM at which the system component (e.g., engine, motor, machine, etc.) is operating.

In exemplary embodiments, a controller is configurable into a learning mode (e.g., FIG. 8, etc.) after the application setup is complete and operational, e.g., after a user has selected the parameter(s) of system component(s) (e.g., engine, motor, pump, machine, etc.) and/or sensor(s) to monitor via the controller, etc. The sensor(s) may include one or more sensor(s) that are a part of, integrated with, or built into a system component, such as a built-in pressure sensor within a pump, etc. Additionally, or alternatively, the sensor(s) may include one or more sensor(s) remote from or beyond a system component, such as a flow meter remotely spaced apart many meters away from a pump, etc.

In the learning mode, the controller is operable for collecting data across a full operational range of the system component. The user selects an acceptable range(s) (e.g., configurable positive/negative (+/−) percentage error threshold(s), a warning alarm threshold (e.g., 5% in FIG. 6), a shutdown alarm fault threshold (e.g., 15% in FIG. 7), etc.) for each parameter to be monitored by the controller for purposes of warnings, alerts, faults, and/or shutdowns. By way of example, the user may be able to select only a single acceptable range (e.g., a 5% error threshold, other percent error threshold higher or lower than 5%, etc.) for all parameters being monitored for purposes of warnings, and select only a single acceptable range (e.g., a 15% error threshold, other percent error threshold higher or lower than 15%, etc.) for all parameters being monitored for purposes of shutdowns. Or, for example, the user may be able to select more than acceptable range (e.g., multiple percent error thresholds for different RPM ranges, etc.) for each parameter being monitored.

The controller is operable for comparing the monitored parameter(s) to the user-selected acceptable range(s) to determine if the monitored parameter(s) is within its acceptable range (e.g., within the user-selected positive/negative (+/−) percentage error threshold at the specific RPM, etc.) or outside its acceptable range (e.g., deviated more than the user-selected positive/negative (+/−) percentage error threshold at the specific RPM, etc.). If it is determined that the monitored parameter(s) is outside its acceptable range (e.g., deviated more than the user-selected positive/negative (+/−) percentage error threshold at the specific RPM, etc.), the controller may then issue a warning, alert, fault, and/or initiate a shutdown. For example, the controller may issue a visible, audible, and/or tactile alarm (e.g., warning alarm, shutdown alarm, etc.) for the user when the controller determines that a monitored parameter deviates from its "normal" and exceeds the user-configurable positive/negative (+/−) percentage error threshold for that monitored parameter for purposes of warnings. Or, for example, the controller may initiate a system shutdown when the controller determines that a monitored parameter exceeds the user-configurable positive/negative (+/−) percentage error threshold for that monitored parameter for purposes of shutdowns.

In exemplary embodiments, a controller (e.g., control panel, controller 104 (FIG. 1), controller 204 (FIG. 2), controllers 304A and 304B (FIG. 3), controller 404 (FIG. 4), etc.) is configured to include or be operable for executing a machine learning process (e.g., a learning algorithm, etc.)

and a fault detection process (e.g., a fault detection algorithm, etc.). During the machine learning process (e.g., via execution of a learning algorithm, etc.), the controller will start at a programmed minimum speed. After a settling delay, the controller will store the desired sensor(s)/system component(s) data (e.g., sensor(s) data, engine data, motor data, machine data, data of another system component, etc.) and the requested speed. The controller will then increase the speed of the system component (e.g., engine, motor, machine, etc.) and start the settling delay timer. After the settling delay, the controller will store the desired sensor(s)/system component(s) data and the requested speed. The controller will continue these previous steps until the requested system component speed reaches the programmed maximum speed of the system component. After these steps are finished, the controller will store all the data captured.

During the fault detection process (e.g., via execution of a fault detection algorithm, etc.), the controller (e.g., control panel, controller 104 (FIG. 1), controller 204 (FIG. 2), controllers 304A and 304B (FIG. 3), controller 404 (FIG. 4), etc.) is configured to use the data collected from the machine learning process and to calculate what the expected values for the sensor(s)/system component(s) data should be at the current requested speed of the system component (e.g., engine, motor, machine, etc.). If the requested speed is between two different datapoints gathered from the learning process, the controller will linearize the value to calculate what the expected sensor(s)/system component(s) data should be. After the expected value is calculated, the controller (e.g., via application programming or software, etc.) will calculate the percent error between the expected value and the current measured value for all the sensor/system component data points captured during the learning phase. The controller (e.g., via application programming or software, etc.) will then generate alerts or alarms (e.g., present or display error message(s), etc.) if any of the datapoints exceeded the configured thresholds (e.g., positive/negative (+/−) percentage error threshold(s) entered by the user, etc.).

In an exemplary embodiment, a system (e.g., for a water transfer application, etc.) includes a controller (e.g., a control panel, etc.) configured to be operable for controlling an engine (e.g., a diesel engine, etc.), which, in turn, is operable for driving (e.g., mechanically spinning, etc.) a pump. The pump may comprise an industrial diesel driven pump at a water source (e.g., lake, pond, river, reservoir, other water source, etc.). In this example, the controller is configured to include or execute a machine learning process during which the controller learns (e.g., algorithmically learns via artificial intelligence (AI) machine learning algorithm(s), etc.) normal flow levels (e.g., within a user configurable positive/negative (+/−) percentage error threshold(s), etc.) across a full RPM operational range of the engine. The normal flow levels established via the machine learning process enable the controller to detect a problem(s) regardless of the RPM at which the engine is operating. With the machine learning, the controller is operable for learning the normal flow at any given RPM of the engine.

The controller is operable for comparing the monitored flow level with the learned normal flow level at the given engine RPM to determine if the monitored flow level is within its acceptable range (e.g., within the user-selected positive/negative (+/−) percentage error threshold at the specific RPM, etc.) or outside its acceptable range (e.g., deviated more than the user-selected positive/negative (+/−) percentage error threshold at the specific RPM, etc.). If it is determined that the monitored flow level is outside its acceptable range (e.g., deviated more than the user-selected positive/negative (+/−) percentage error threshold at the specific RPM, etc.), the controller may then issue a warning (e.g., a warning alarm, a shutdown alarm, display or present an error message, etc.) and/or initiate a shutdown. Accordingly, the controller may thus be operable for detecting issues or problems associated with the flow levels at any given RPM of the engine, such as detection of a clogged input due to debris based on less than expected flow at a given RPM of the engine, a partially or completely obstructed output (e.g., a truck parked on the output hose, etc.) based on less than expected flow at a given RPM of the engine, a busted output hose based on more than expected flow at a given RPM of the engine, etc.

In another exemplary embodiment, a system (e.g., for a sewer bypass application, etc.) includes a controller (e.g., a control panel, etc.) configured to be operable for controlling a variable frequency drive (VFD) and an electric motor (e.g., a three-phase AC motor, etc.). The motor is operable for driving (e.g., mechanically spinning, etc.) a pump. The VFD enables speed control for the electric motor. More specifically, the VFD is operable for manipulating the frequency of the output by rectifying an incoming AC current into DC, and then using voltage pulse-width modulation (PWM) to recreate an AC current and voltage output waveform. In this example, the controller is configured to include or execute a machine learning process during which the controller learns (e.g., algorithmically learns via artificial intelligence (AI) machine learning algorithm(s), etc.) normal power consumption and torque levels (e.g., within user configurable positive/negative (+/−) percentage error threshold(s), etc.) across a full RPM operational range of the electric motor. The normal power consumption and torque levels established via the machine learning process enable the controller to detect a problem(s) or issue(s) regardless of the RPM at which the electric motor is operating.

The controller is operable for comparing the monitored normal power consumption and torque levels with the learned normal power consumption and torque levels at the given motor RPM to determine if the monitored normal power consumption and torque levels are within the acceptable range (e.g., within the user-selected positive/negative (+/−) percentage error threshold at the specific RPM, etc.) or outside the acceptable range (e.g., deviated more than the user-selected positive/negative (+/−) percentage error threshold at the specific RPM, etc.). If it is determined that the monitored normal power consumption and torque levels is outside the acceptable range (e.g., deviated more than the user-selected positive/negative (+/−) percentage error threshold at the specific RPM, etc.), the controller may then issue a warning, alert, fault (e.g., a warning alarm, a shutdown alarm, display or present an error message, etc.) and/or initiate a shutdown. Accordingly, the controller may thus be operable for detecting issues or problems associated with the power consumption and torque levels at any given RPM of the electric motor, such as detection of electric motor damage or failure based on less than or more than expected power and/or torque at a given RPM of the electric motor, detection of pump damage or failure based on less than or more than expected power and/or torque at a given RPM of the electric motor, detection of a clogged input due to debris based on less than or more than expected power and/or torque at a given RPM of the electric motor, etc.

With reference now to the figures, FIG. 1 illustrates an exemplary embodiment of a system 100 that includes a machine-learning controller 104 embodying one or more aspects of the present disclosure. The controller 104 is configured to be operable for controlling an engine 108 (e.g., diesel engine, etc.), which, in turn, is operable for driving (e.g., mechanically spinning, etc.) a pump 112.

The controller 104 is in communication with one or more sensors 116 (e.g., flow sensor(s), suction and/or discharge pressure sensors, tank level sensor(s) at source tank(s) and/or output tank(s), etc.). FIG. 1 shows the sensors 116 remotely spaced apart from the engine 108 and the pump 112. But the system 100 may also include one or more sensor(s) that are a part of, integrated with, or built into the engine 108 and/or the pump 112, such as a built-in pressure sensor within the pump 112, etc.

In response to output from the sensors 116 communicated to the controller 104 (e.g., via a hard wired connection, wireless connection, etc.), the controller 104 may control operation of the pump 112 by sending commands to the engine's electronic control unit (ECU) (e.g., via a controller area network (CAN bus), etc.) for controllably changing the speed of the engine 108 that is driving the pump 112. The pump 112 may comprise an industrial diesel driven pump at a water source 120 (e.g., lake, pond, river, reservoir, tank, other water source, etc.) that is operable for transferring water from the water source 120 to a second location 124.

In this exemplary embodiment, the controller 104 is configured to include or execute a machine learning process during which the controller 104 learns (e.g., algorithmically learns via artificial intelligence (AI) machine learning algorithm(s), etc.) normal flow levels based on or corresponding with acceptable range(s) (e.g., user-selected configurable positive/negative (+/−) percentage error threshold(s), etc.) across a full RPM operational range of the engine 108. With the machine learning, the controller 104 is operable for learning the normal flow at any given RPM of the engine 108.

The controller 104 is operable for comparing the monitored flow level with the learned normal flow level at the given engine RPM to determine if the monitored flow level is within its acceptable range (e.g., within the user-selected positive/negative (+/−) percentage error threshold at the specific RPM, etc.) or outside its acceptable range (e.g., deviated more than the user-selected positive/negative (+/−) percentage error threshold at the specific RPM, etc.). If it is determined that the monitored flow level is outside its acceptable range, the controller 104 may then issue a warning (e.g., a warning alarm, a shutdown alarm, display or present an error message, etc.) and/or initiate a shutdown. Accordingly, the controller 104 may thus be operable for detecting issues or problems associated with the flow levels at any given RPM of the engine, such as detection of a clogged input due to debris based on less than expected flow at a given RPM of the engine 108, a partially or completely obstructed output (e.g., a truck parked on the output hose, etc.) based on less than expected flow at a given RPM of the engine 108, a busted output hose based on more than expected flow at a given RPM of the engine 108, etc.

Figure 2:
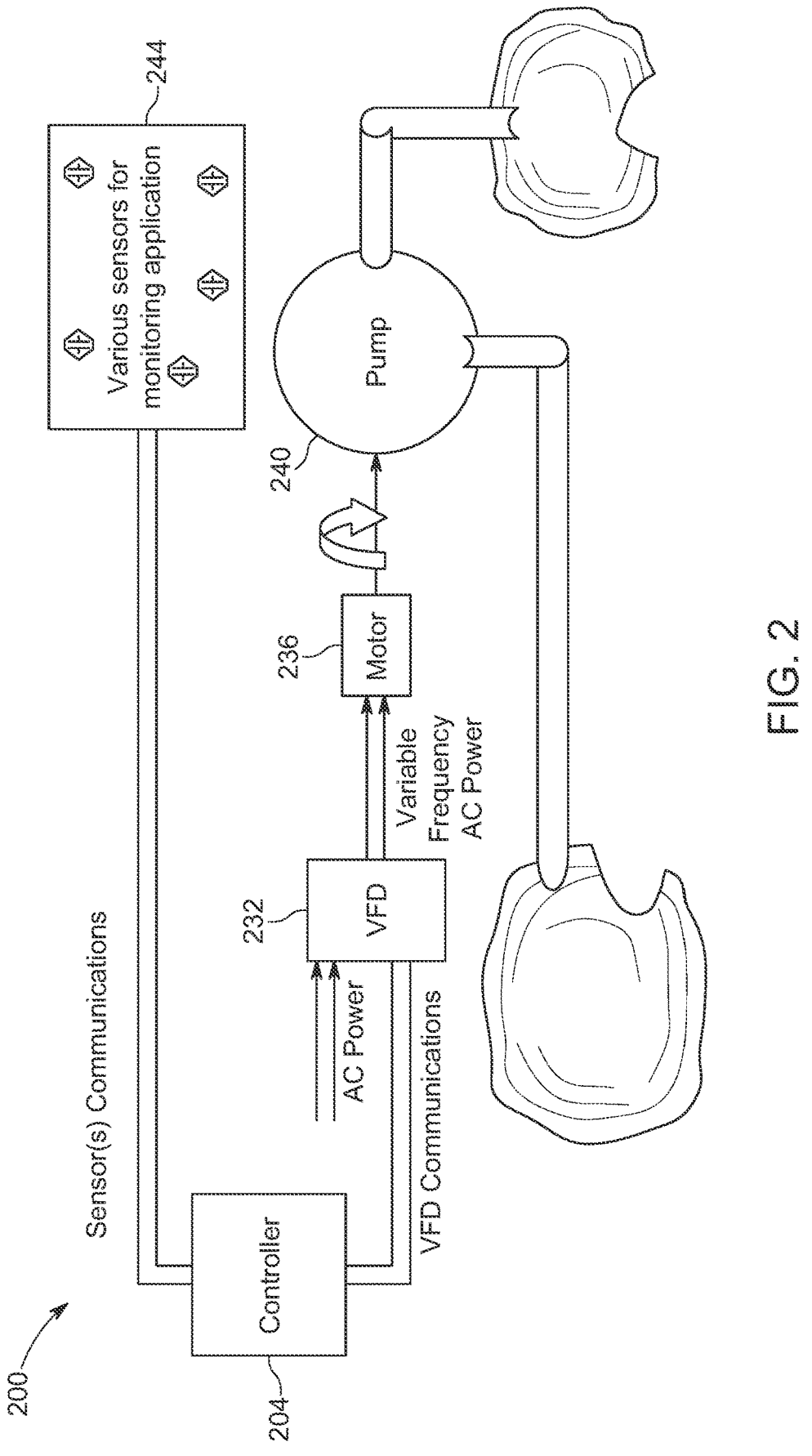

FIG. 2 illustrates an exemplary embodiment of a system 200 including a machine-learning controller 204 embodying one or more aspects of the present disclosure. The controller 204 is configured to be operable for controlling a variable frequency drive (VFD) 232, e.g., via ModBus data communications protocol, etc. In turn, the VFD 232 enables speed control of a three-phase AC motor 236 (broadly, a motor) that drives (e.g., mechanically spins, etc.) a pump 240. The VFD 232 is operable for manipulating the frequency of the output by rectifying an incoming AC current into DC, and then using voltage pulse-width modulation (PWM) to recreate an AC current and voltage output waveform.

A communication link (e.g., hard wired connection, wireless connection, etc.) is provided from the controller 204 to the VFD 232. For example, a single cable or other suitable communication link may be provided from the controller 204 to the VFD 232.

The controller 204 is configured to be operable for monitoring one or more sensors 244 (e.g., flow sensor(s), suction and/or discharge pressure sensors, tank level sensor(s) at source tank(s) and/or output tank(s), etc.). FIG. 2 shows the sensors 244 remotely spaced apart from the motor 236 and the pump 240. But the system 200 may also include one or more sensor(s) that are a part of, integrated with, or built into the motor 236 and/or the pump 240, such as a built-in pressure sensor within the pump 240, etc.

In response to the sensor output (e.g., received via a hard wired connection, wireless connection, etc.), the controller 204 is configured to be operable controlling the VFD 232, e.g., to start, vary the RPMs (revolutions per minute), and stop the motor 236 based on the configured behavior, etc.

In this exemplary embodiment, the controller 204 is configured to include or execute a machine learning process during which the controller 204 learns (e.g., algorithmically learns via artificial intelligence (AI) machine learning algorithm(s), etc.) normal power consumption and torque levels based on or corresponding with acceptable range(s) (e.g., user-selected configurable positive/negative (+/−) percentage error thresholds, etc.) across a full RPM operational range of the motor 236. The normal power consumption and torque levels established via the machine learning process enable the controller 204 to detect a problem(s) regardless of the RPM at which the motor 236 is operating.

The controller 204 is operable for comparing the monitored normal power consumption and torque levels with the learned normal power consumption and torque levels at the given motor RPM to determine if the monitored normal power consumption and torque levels are within the acceptable range (e.g., within the user-selected positive/negative (+/−) percentage error threshold at the specific RPM, etc.) or outside the acceptable range (e.g., deviated more than the user-selected positive/negative (+/−) percentage error threshold at the specific RPM, etc.). If it is determined that the monitored normal power consumption and torque levels is outside the acceptable range, the controller 204 may then issue a warning, alert, fault (e.g., a warning alarm, a shutdown alarm, display or present an error message, etc.) and/or initiate a shutdown. Accordingly, the controller 204 may thus be operable for detecting issues or problems associated with the power consumption and torque levels at any given RPM of the motor 236, such as detection of motor damage or failure based on less than or more than expected power and/or torque at a given RPM of the motor 236, detection of pump damage or failure based on less than or more than expected power and/or torque at a given RPM of the motor 236, detection of a clogged input of the pump 240 due to debris based on less than or more than expected power and/or torque at a given RPM of the motor 236, etc.

Figure 3:
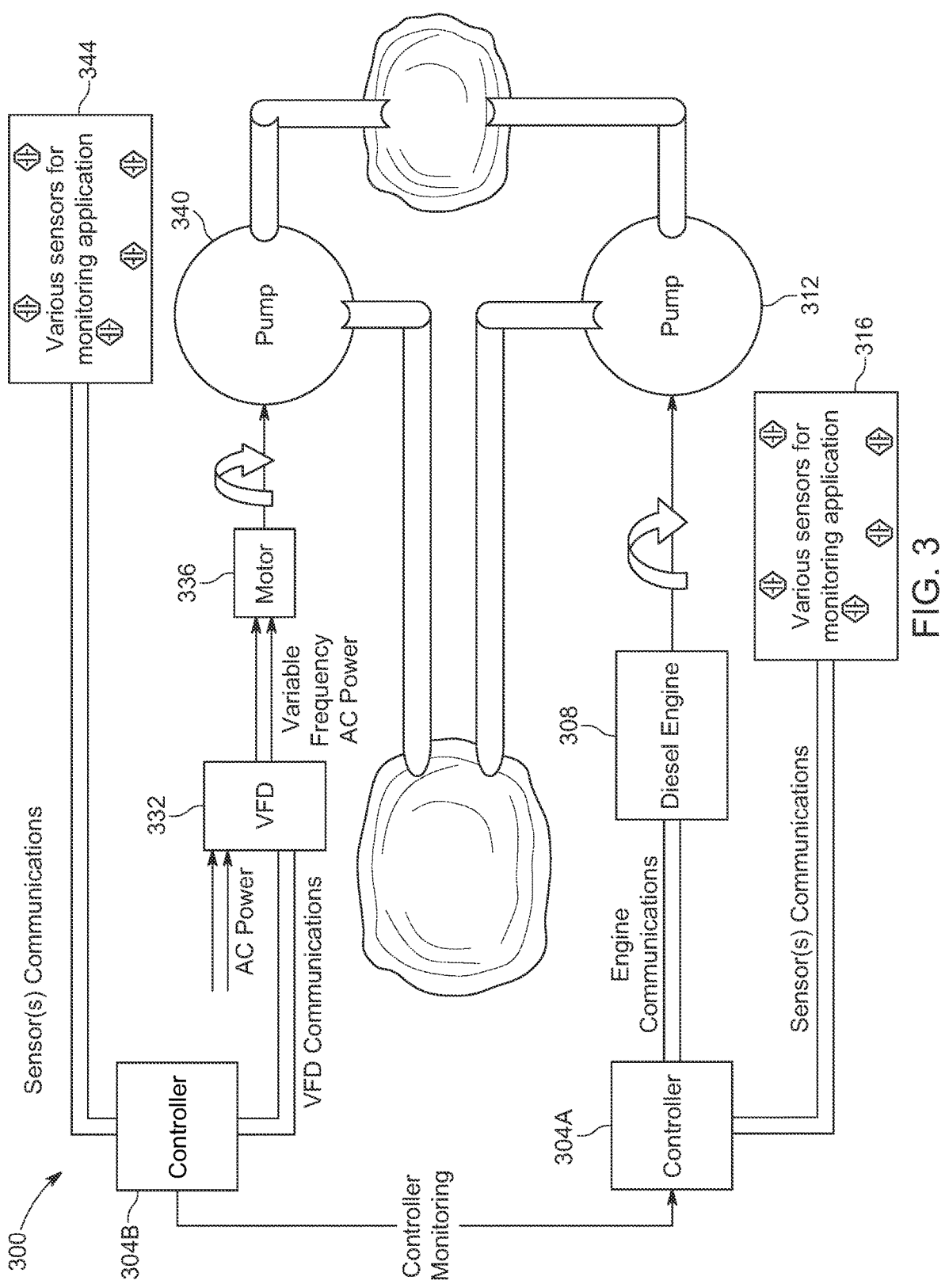

FIG. 3 illustrates an exemplary embodiment of a system 300 including first and second machine-learning controllers 304A and 304B embodying one or more aspects of the present disclosure. The first and second controllers 304A and 304B and other system components shown in FIG. 3 may be identical or substantially similar to the respective controller 104 (FIG. 1) and controller 204 (FIG. 2) and corresponding system components described above.

For example, and similar to the controller 104 (FIG. 1), the first controller 304A is configured to be operable for controlling an engine 308 (e.g., diesel engine, etc.), which, in turn, is operable for driving (e.g., mechanically spinning, etc.) a first pump 312. The first controller 304A is configured to be operable for monitoring one or more sensors 316 (e.g., flow sensor(s), suction and/or discharge pressure sensors, tank level sensor(s) at source tank(s) and/or output tank(s), etc.). In response to the sensor output, the first controller 304A may control operation of the first pump 312 by sending commands to the engine's electronic control unit (ECU) (e.g., via a controller area network (CAN bus), etc.) for controllably changing the speed of the engine 308 that is driving the first pump 312.

The first controller 304A is configured to include or execute a machine learning process during which the first controller 304A learns (e.g., algorithmically learns via artificial intelligence (AI) machine learning algorithm(s), etc.) normal flow levels based on or corresponding with acceptable range(s) (e.g., user-selected configurable positive/negative (+/−) percentage error threshold(s), etc.) across a full RPM operational range of the engine 308. The first controller 304A is operable for comparing the monitored flow level with the learned normal flow level at the given engine RPM to determine if the monitored flow level is within its acceptable range (e.g., within the user-selected positive/negative (+/−) percentage error threshold at the specific RPM, etc.) or outside its acceptable range (e.g., deviated more than the user-selected positive/negative (+/−) percentage error threshold at the specific RPM, etc.). If it is determined that the monitored flow level is outside its acceptable range, the first controller 304A may then issue a warning (e.g., a warning alarm, a shutdown alarm, display or present an error message, etc.) and/or initiate a shutdown. Accordingly, the first controller 304A may thus be operable for detecting issues or problems associated with the flow levels of the first pump 312 at any given RPM of the engine 308, such as detection of a clogged input of the first pump 312 due to debris based on less than expected flow at a given RPM of the engine 308, detection of a partially or completely obstructed output from the first pump 312 (e.g., a truck parked on the output hose, etc.) based on less than expected flow at a given RPM of the engine 308, detection of a busted output hose from the first pump 312 based on more than expected flow at a given RPM of the engine 308, etc.

Similar to the controller 204 (FIG. 2), the second controller 304B is configured to be operable for controlling a variable frequency drive (VFD) 332, which enables speed control of a three-phase AC motor 336 (broadly, a motor) that drives (e.g., mechanically spins, etc.) a second pump 340. The second controller 304B is configured to be operable for monitoring one or more sensors 344 (e.g., flow sensor(s), suction and/or discharge pressure sensors, tank level sensor(s) at source tank(s) and/or output tank(s), etc.). In response to the sensor output, the second controller 304B is configured to be operable controlling the VFD 332, e.g., to start, vary the RPMs (revolutions per minute), and stop the motor 336 based on the configured behavior, etc.

The second controller 304B is configured to include or execute a machine learning process during which the second controller 304B learns (e.g., algorithmically learns via artificial intelligence (AI) machine learning algorithm(s), etc.) normal power consumption and torque levels based on or corresponding with acceptable range(s) (e.g., user-selected configurable positive/negative (+/−) percentage error thresholds, etc.) across a full RPM operational range of the motor 336. The second controller 304B is operable for comparing the monitored normal power consumption and torque levels with the learned normal power consumption and torque levels at the given motor RPM to determine if the monitored normal power consumption and torque levels are within the acceptable range (e.g., within the user-selected positive/negative (+/−) percentage error threshold at the specific RPM, etc.) or outside the acceptable range (e.g., deviated more than the user-selected positive/negative (+/−) percentage error threshold at the specific RPM, etc.). If it is determined that the monitored normal power consumption and torque levels is outside the acceptable range, the second controller 304B may then issue a warning, alert, fault (e.g., a warning alarm, a shutdown alarm, display or present an error message, etc.) and/or initiate a shutdown. Accordingly, the second controller 304B may thus be operable for detecting issues or problems associated with the power consumption and torque levels of the motor 336 at any given RPM of the motor 336, such as detection of motor damage or failure based on less than or more than expected power and/or torque at a given RPM of the motor 336, detection of damage to or failure of the second pump 340 based on less than or more than expected power and/or torque at a given RPM of the motor 336, detection of a clogged input of the second pump 340 due to debris based on less than or more than expected power and/or torque at a given RPM of the motor 336, etc.

FIG. 3 shows the sensors 316 remotely spaced apart from the engine 308 and the first pump 312. But the system 300 may also include one or more sensor(s) that are a part of, integrated with, or built into the engine 308 and/or the first pump 312, such as a built-in pressure sensor within the first pump 312, etc. FIG. 3 also shows the sensors 344 remotely spaced apart from the motor 336 and the second pump 340. Again, however, the system 300 may also include one or more sensor(s) that are a part of, integrated with, or built into the motor 336 and/or the second pump 340, such as a built-in pressure sensor within the second pump 340, etc.

Figure 4:
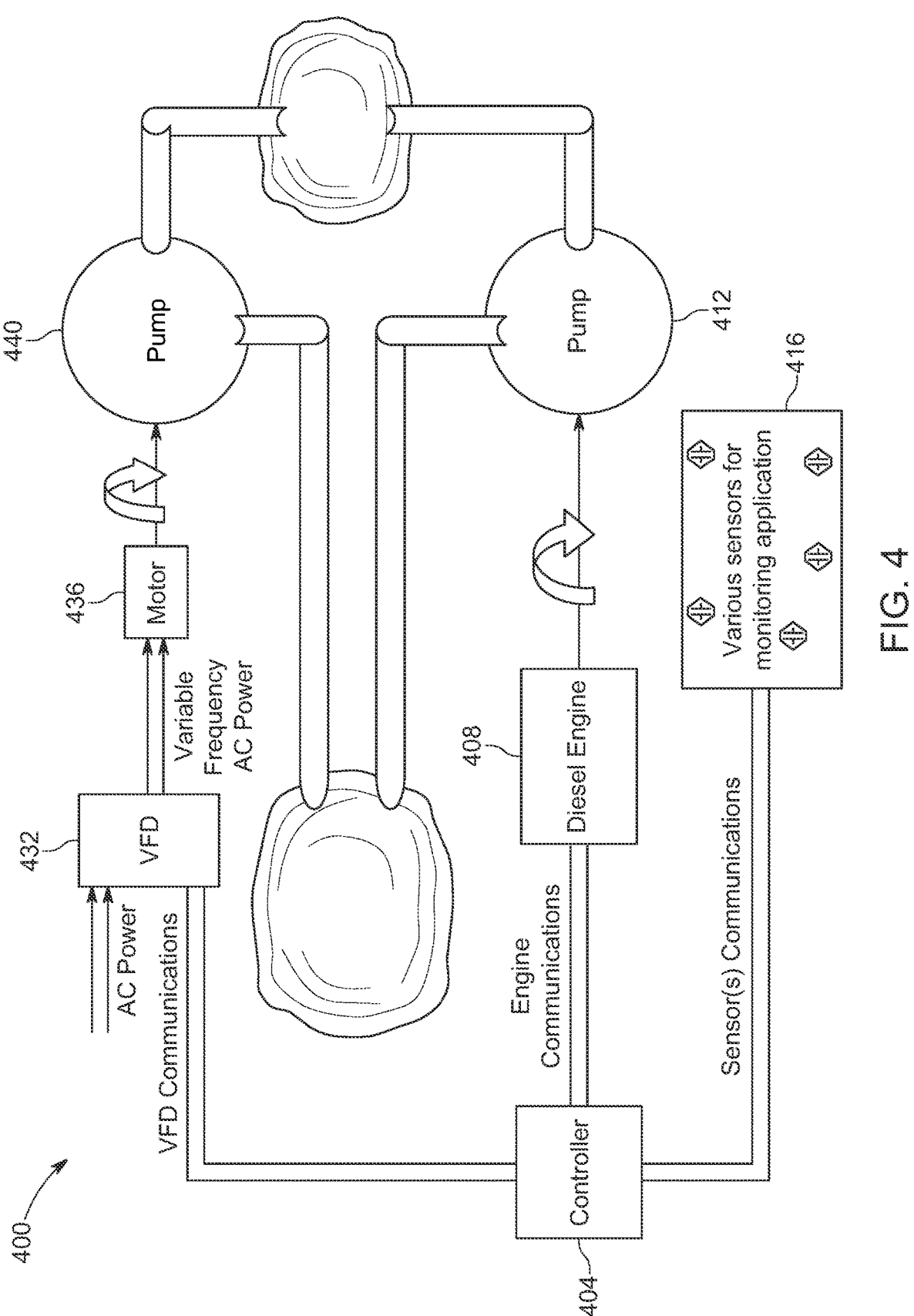

FIG. 4 illustrates an exemplary embodiment of a system 400 including a machine-learning controller 404 embodying one or more aspects of the present disclosure. The controller 404 is configured to be operable for controlling a variable frequency drive (VFD) 432 and an engine 408, e.g., in response to or based on the controller's own communications and received sensor output from one or more sensors 416 (e.g., flow sensor(s), suction and/or discharge pressure sensors, tank level sensor(s) at source tank(s) and/or output tank(s), etc.) in communication with the controller 404, etc.

The controller 404 is configured for controlling operation of the VFD 432 itself, e.g., via ModBus data communications protocol, etc. In turn, the VFD 432 enables speed control of a three-phase AC motor 436 (broadly, a motor) that drives (e.g., mechanically spins, etc.) a second pump 440. The VFD 432 is operable for manipulating the frequency of the output by rectifying an incoming AC current into DC, and then using voltage pulse-width modulation (PWM) to recreate an AC current and voltage output waveform.

A communication link (e.g., hard wired connection, wireless connection, etc.) is provided from the controller 404 to the VFD 432. For example, a single cable or other suitable communication link may be provided from the controller 404 to the VFD 432. The controller 404 is configured to be operable for monitoring the one or more sensors 416. In response to the sensor output (e.g., received via a hard wired connection, wireless connection, etc.), the controller 404 is configured to be operable controlling the VFD 432, e.g., to start, vary the RPMs (revolutions per minute), and stop the motor 436 based on the configured behavior, etc.

The same single controller 404 is also configured for controlling operation of the diesel engine 408 (broadly, an engine) that drives (e.g., mechanically spins, etc.) a first pump 412. For example, the controller 404 may send commands to the diesel engine's electronic control unit (ECU) via a controller area network (CAN bus).

The controller 404 is configured to include or execute a machine learning process during which the controller 404 learns (e.g., algorithmically learns via artificial intelligence (AI) machine learning algorithm(s), etc.) normal flow levels based on or corresponding with acceptable range(s) (e.g., user-selected configurable positive/negative (+/−) percentage error threshold(s), etc.) across a full RPM operational range of the engine 408. The controller 404 is operable for comparing the monitored flow level with the learned normal flow level at the given engine RPM to determine if the monitored flow level is within its acceptable range (e.g., within the user-selected positive/negative (+/−) percentage error threshold at the specific RPM, etc.) or outside its acceptable range (e.g., deviated more than the user-selected positive/negative (+/−) percentage error threshold at the specific RPM, etc.). If it is determined that the monitored flow level is outside its acceptable range, the controller 404 may then issue a warning (e.g., a warning alarm, a shutdown alarm, display or present an error message, etc.) and/or initiate a shutdown. Accordingly, the controller 404 may thus be operable for detecting issues or problems associated with the flow levels of the first pump 412 at any given RPM of the engine 408, such as detection of a clogged input of the first pump 412 due to debris based on less than expected flow at a given RPM of the engine 408, detection of a partially or completely obstructed output (e.g., a truck parked on the output hose from the second pump 440, etc.) based on less than expected flow at a given RPM of the engine 408, detection of a busted output hose from the first pump 412 based on more than expected flow at a given RPM of the engine 408, etc.

During the machine learning process, the controller 404 also learns normal power consumption and torque levels of the motor 436 based on or corresponding with acceptable range(s) (e.g., user-selected configurable positive/negative (+/−) percentage error thresholds, etc.) across a full RPM operational range of the motor 436. The controller 404 is operable for comparing the monitored normal power consumption and torque levels with the learned normal power consumption and torque levels at the given motor RPM to determine if the monitored normal power consumption and torque levels are within the acceptable range (e.g., within the user-selected positive/negative (+/−) percentage error threshold at the specific RPM, etc.) or outside the acceptable range (e.g., deviated more than the user-selected positive/negative (+/−) percentage error threshold at the specific RPM, etc.). If it is determined that the monitored normal power consumption and torque levels is outside the acceptable range, the controller may then issue a warning, alert, fault (e.g., a warning alarm, a shutdown alarm, display or present an error message, etc.) and/or initiate a shutdown. Accordingly, the controller 404 may thus be operable for detecting issues or problems associated with the power consumption and torque levels of the motor 436 at any given RPM of the motor 436, such as detection of damage to or failure of the motor 436 based on less than or more than expected power and/or torque at a given RPM of the motor 436, detection of damage to or failure of the second pump 440 based on less than or more than expected power and/or torque at a given RPM of the motor 436, detection of a clogged input of the second pump 440 due to debris based on less than or more than expected power and/or torque at a given RPM of the motor 436, etc.

FIG. 4 shows the sensors 416 remotely spaced apart from the engine 408, motor 436, and first and second pumps 412 and 440. But the system 400 may also include one or more sensor(s) that are a part of, integrated with, or built into the engine 408, motor 436, first pump 412, and/or second pump 440, such as a built-in pressure sensor within the first pump 412 and/or second pump 440, etc.

Figure 5:
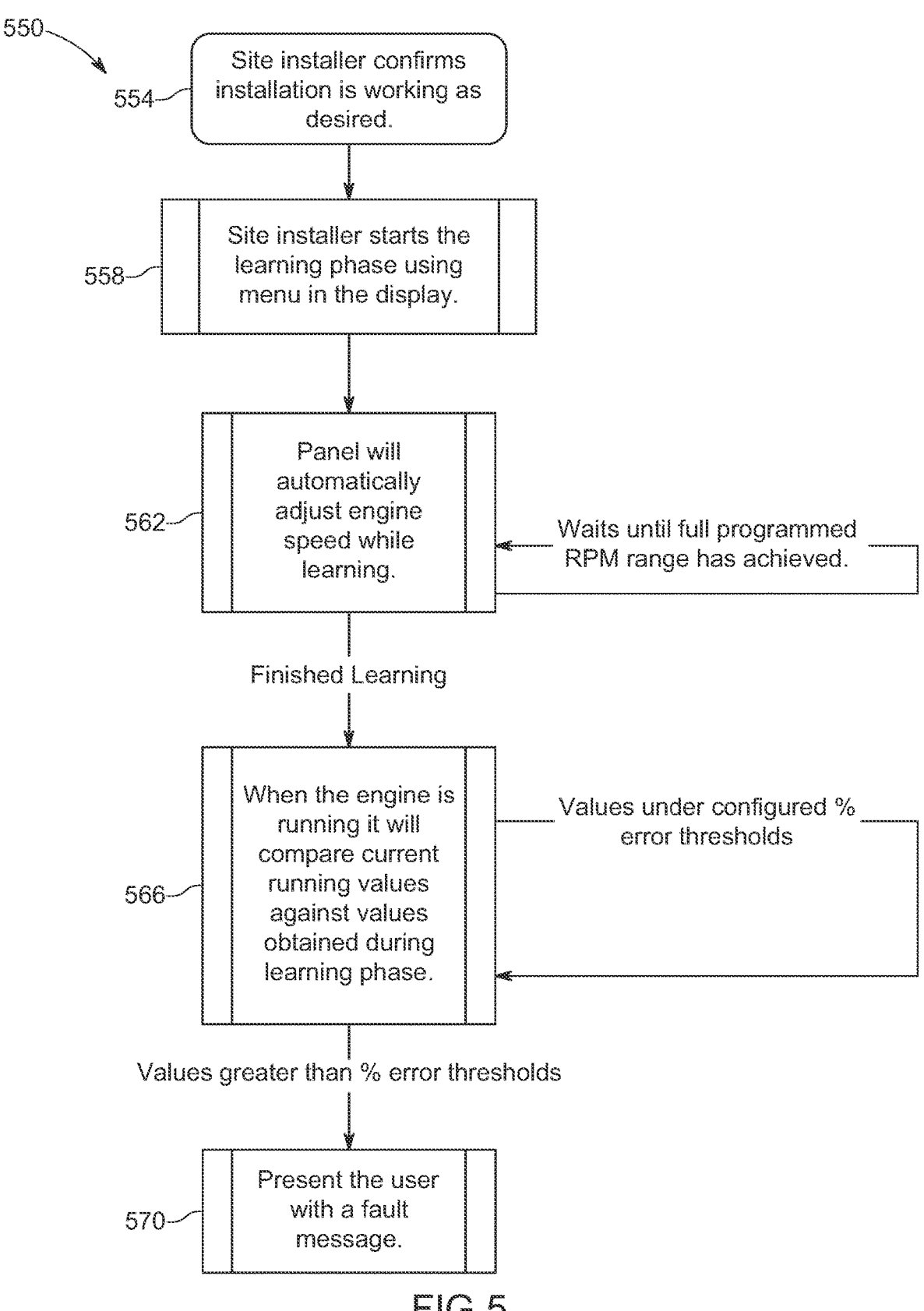

FIG. 5 illustrates a flowchart of an exemplary method in which a controller (e.g., controller 104 (FIG. 1), controller 204 (FIG. 2), controllers 304A and 304B (FIG. 3), controller 404 (FIG. 4), control panel, etc.) learns (e.g., algorithmically learns via artificial intelligence (AI) machine learning algorithm(s), etc.) normal level(s) of parameter(s) of system component(s) and/or sensor(s) to be monitored across a full operational range (e.g., full RPM range of an engine, machine, motor, etc.) of the system component(s) and thereafter compares the monitored parameter(s) of the system component(s) and/or sensor(s) to the normal level(s) for detection of issues (s) or problem(s).

As shown in FIG. 5, the method 550 begins at 554 at which the site installer confirms that the installation or overall system is working as desired. At 558, the site installer starts the learning phase for the controller by using the menu in the display (e.g., FIGS. 6, 7, and 8, etc.) of the controller.

At 562, the controller automatically adjusts the speed of the engine (broadly, system component) while learning as disclosed herein. The controller continues to learn until the full programmed RPM range of the engine has been achieved.

When the controller has finished the learning phase, the method 554 proceeds to 566 at which the controller compares the current running values (when the engine is running) of the parameter(s) being monitored against the values obtained during the learning phase. If the current running values as compared to the learned values are under the configured percentage error threshold(s), the controller continues to compare the running values with the learned values and the system continues operating. But if the current running values as compared to the learned values are greater than the configured percentage error threshold(s), the controller presents the user with a fault message at 570.

Figure 6:
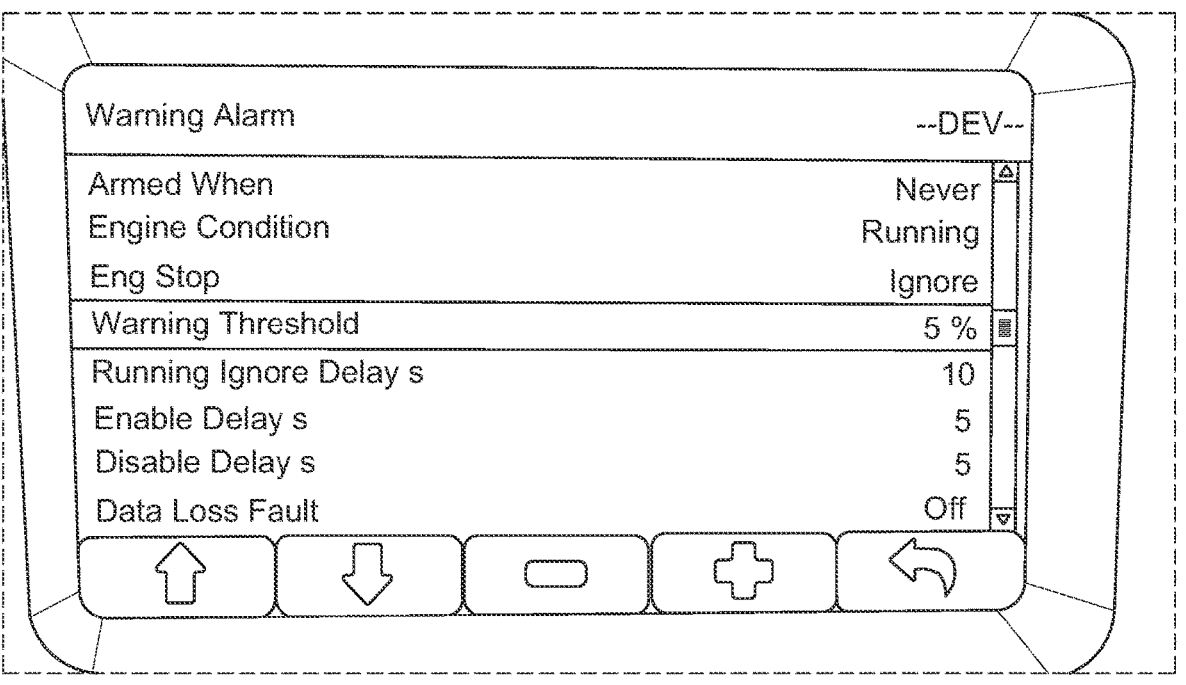
FIG. 6 shows an exemplary Warning Alarm menu on a display of a control panel according to an exemplary embodiment of the present disclosure.

FIG. 6 shows an exemplary Warning Alarm menu on a display of a control panel according to an exemplary embodiment of the present disclosure. As shown in FIG. 6, a 5% warning threshold has been selected for purposes of warning alarms. In this example, the control panel may thus be configured to issue a warning alarm when the controller determines that the value of the monitored parameter as compared to the learned value at the specific RPM exceeds the 5% warning threshold selected by the user. The 5% warning threshold may be increased or decreased by using touchscreen buttons along the bottom of the display. The touchscreen buttons may also be used for selecting and modifying other user selectable options shown in FIG. 6 including Armed When, Engine Condition, Engine Stop, Running Ignore Delay in seconds (s), Enable Delay (s), Disable Delay (s), and Data Loss Fault.

Figure 7:
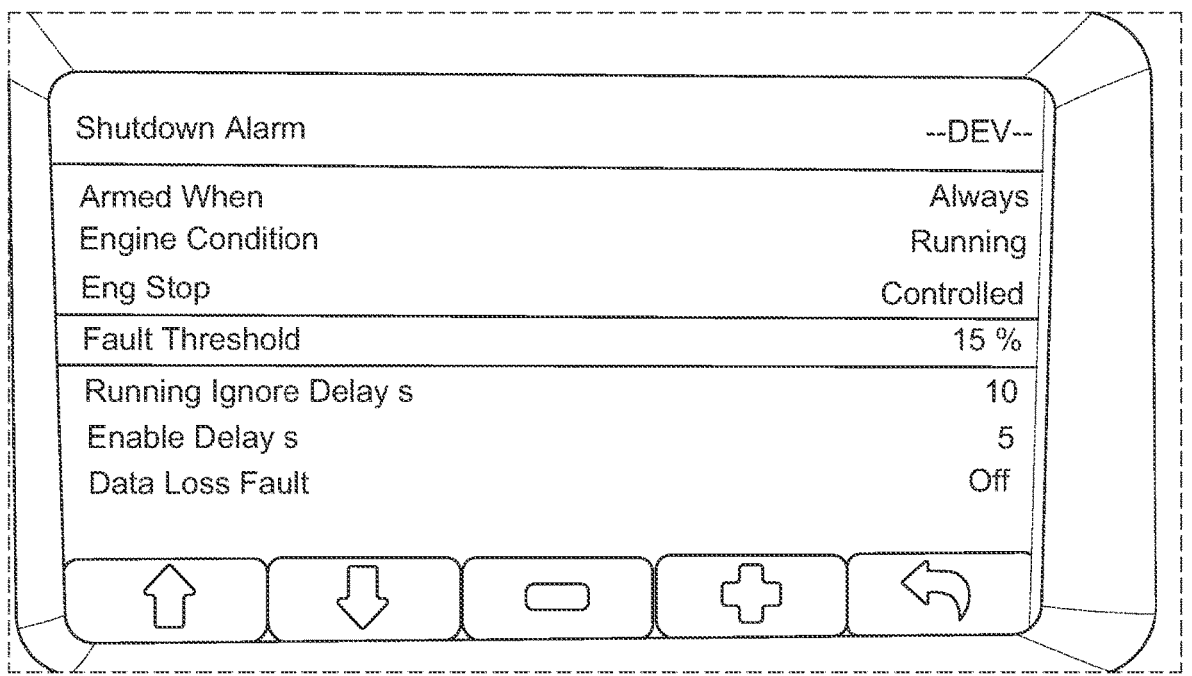
FIG. 7 shows an exemplary Shutdown Alarm menu on a display of a control panel according to an exemplary embodiment of the present disclosure.

FIG. 7 shows an exemplary Shutdown Alarm menu on a display of a control panel according to an exemplary embodiment of the present disclosure. As shown in FIG. 7, a 15% fault threshold has been selected for purposes of shutdown alarms. In this example, the control panel may thus be configured to issue a shutdown alarm when the controller determines that the value of the monitored parameter as compared to the learned value at the specific RPM exceeds the 15% fault threshold selected by the user. The 15% fault threshold may be increased or decreased by using the touchscreen buttons along the bottom of the display. The touchscreen buttons may also be used for selecting and modifying other user selectable options shown in FIG. 7 including Armed When, Engine Condition, Engine Stop, Running Ignore Delay in seconds (s), Enable Delay (s), and Data Loss Fault.

Figure 8:
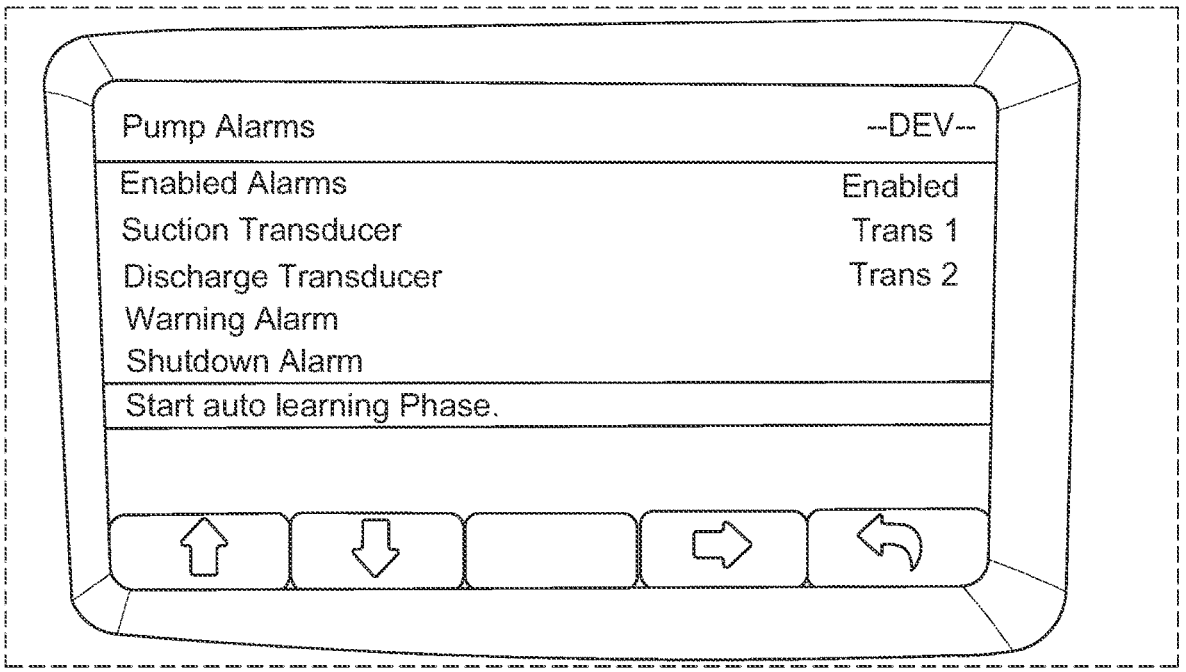
FIG. 8 shows an exemplary Pump Alarms menu on a display of a control panel according to an exemplary embodiment of the present disclosure.

FIG. 8 shows an exemplary Pump Alarms menu on a display of a control panel according to an exemplary embodiment of the present disclosure. As shown in FIG. 8, Start auto learning phase has been selected. Touchscreen buttons along the bottom of the display may also be used for selecting, modifying, and navigating to other user selectable options or menus shown in FIG. 8 including Enabled Alarms, Suction Transducer, Discharge Transducer, Warning Alarm (FIG. 6), and Shutdown Alarm (FIG. 7).

By way of example only, the control panel display shown in FIGS. 6, 7, and 8 may comprise a sunlight-viewable 4.3 inch diagonal WQVGA color display with five integrated backlit display buttons. Alternative embodiments may include or be used with control panels or devices having different displays and/or different user interfaces (e.g., push-button(s), joystick(s), touchscreen, etc.).

In exemplary embodiments, a controller disclosed herein (e.g., controller 104 (FIG. 1), controller 204 (FIG. 2), controllers 304A and 304B (FIG. 3), controller 404 (FIG. 4), a CANplus™ CP1000 control panel 904 (FIG. 9), other control panel or machine learning panel, etc.) is not limited to only one saved learned profile. In such exemplary embodiments, the controller or control panel is configured to learn (e.g., algorithmically learns via artificial intelligence (AI) machine learning algorithm(s), etc.) a first or initial profile when the application is initially setup and then learn (e.g., algorithmically learns via artificial intelligence (AI) machine learning algorithm(s), etc.) another profile(s) later and compare operations against the multiple (e.g., both, etc.) learned profiles. The first learned profile could have a wider tolerance before a warning or fault is triggered or thrown while the second learned profile is monitoring for smaller deviations. This could be useful for longer term/permanent applications. The first learned profile could be looking for signs of aging and degradation, while the second learned profile is looking for changes as described herein. An example includes a fuel usage profile that is learned after an initial setup of the system. Based on the learned information in the saved fuel usage profile, the controller or control panel may notify or alert the user when fuel usage increases beyond a certain point over the life of the application. The notification or alert could be an indicator that indicates maintenance is needed and likely beneficial. The second or later learning of fuel usage by the controller or control panel could be performed with the knowledge that fuel usage is increasing but not to the level set or established by the first learning process. With the second learned profile, the controller or control panel can continue to look for changes that might indicate an issue that developed, such as a clogged pipe, etc.

The inventors have also recognized that an input(s) may benefit from a secondary process to the data as the data is being machine learned by the control panel in exemplary embodiments. For example, suction pressure on the input side of the pump will vary with the level in the tank. It is expected that more suction (less pressure) would be required to lift the water out of the tank as the water level lowers in the tank. Depending on conditions, a false warning or failure could be generated as the suction increases. To compensate, a level transducer may be added to the system in exemplary embodiments. In such exemplary embodiments, the control panel may be configured to machine learn the suction at a particular tank level as measured by the level transducer. Under normal operation, as the level changes, the control panel performs secondary processing to adjust the normal suction for the changes in tank level.

In exemplary embodiments, a controller disclosed herein (e.g., controller 104 (FIG. 1), controller 204 (FIG. 2), controllers 304A and 304B (FIG. 3), controller 404 (FIG. 4), a CANplus™ CP1000 control panel 904 (FIG. 9), other control panel or machine learning panel, etc.) is configured with machine learning for engine and VFD control that delivers the next generation of industry-leading performance and reliability for equipment operators. In exemplary embodiments, machine learning is a function of the engine or VFD control panel that helps the control panel learn what its "Normal Operation" thereby enabling the control panel to alert pump operators when the control panel is no longer in the normal range. The normal operating range is specific to the application, engine, or VFD using the control panel rather than relying on factory default settings. The machine learning enables the control panel to learn and monitor the specific application or end use.

After the engine or VFD control panel and application are set up with the desired flows, pressures, and settings, the control panel begins the machine-learning process according to exemplary embodiments disclosed herein. The control panel cycles through the entire operating range of the application, assessing and learning about all of the sensors and engine or VFD information coming into the control panel. The control panel uses the received information to set up normal levels (green) to indicate that things are going well and operating as expected. It typically takes three to five minutes to complete the sequence. After the machine learning process is complete, the control panel will automatically start monitoring the system. The control panel will identify when operational parameters are trending out of the normal operating range allowing preemptive action to address the problem. The control panel also looks at fluctuations and deviations of all the signals coming in to establish yellow warning and red fault areas. The control panel will warn and alert when any monitored parameter moves outside the normal range for a specified amount of time. Machine learning on the control panel utilizes powerful, edge-computing capabilities to monitor the application without the need for telemetry. While not required, the control panel may also be configured to fully support remote monitoring when telemetry is added. And each learned parameter may have a custom SPN that can trigger notifications when used with RemoteIQ™ telemetry monitoring service, etc.

In exemplary embodiments, the control panel is configured with local machine learning such that all learning, analysis, monitoring, and alerting are performed directly by the control panel. Telemetry is not required. The control panel will learn the normal operation of an application by looking at multiple inputs from sensors, engines, and VFDs. The learning stage only takes minutes and once done, alarm levels for warnings and faults are automatically set. The control panel will then monitor all the learned parameters. The status is shown on the display with gauges (e.g., FIGS. 10-14,). etc. Alarms that occur are sent out on the CAN bus and telemetry if installed.

After the pumping application is setup and running as desired (e.g., suction, pressure, flow, lift, etc. are all operating as desired), the control panel is first configured for machine learning. This may be accomplished by navigating, with a TECH level access, to the machine learning menu and enabling it.

The next step is to configure which inputs are to be used for the Suction input, Discharge input, etc. Navigate to the Settings menu. Below is an example of the first part of the machine learning settings menu with descriptions:

Setup
Suction Transducer—Selections (Transducer 1, 2, 3, 4, 5, 6, Disabled)
Discharge Transducer—Selections (Transducer 1, 2, 3, 4, 5, 6, Disabled)
Flow Meter—Selections (Transducer 1, 2, 3, 4, 5, 6, Pulse, Disabled)
Minimum RPM—(RPM)
    The applications operational minimum RPM, which could be higher than idle. Example: At idle, the pump is unable to maintain enough suction to lift the water the required amount. The application requires 1000 RPMs to properly lift the water and maintain operation. Therefore, machine learning's minimum RPM should be set to no lower than 1000.
Maximum RPM—Setting (RPM)
    The applications operational maximum RPM, which could be lower than the pump/engines max RPM.
    Example: Due to other limitations, the pump would generate to much discharge pressure at the engine's or pump's max RPM of 3000. This application's max RPM is 2500. Therefore, the machine learning's Maximum RPM should be set to no higher than 2500.
Settling Time—(Seconds)
    Default is 30 seconds
    The time the panel waits after an RPM change before the learning starts at the new RPM.
    This value should be set to a long enough time for the system to stabilize.
    This value affects the overall learning time. A conservatively long setting time will ensure the system is stable but will make the overall learning time longer. However, an aggressively short time will decrease the overall learning time but could lead to less accurate learning of the application if the system is not yet stable.
Learning Time—(Seconds)
    Default is 15 seconds
    The time the panel learns the behavior at each RPM stage.
    This value affects the overall learning time. A conservatively long learning time will ensure most accurate learning of the application but make the overall learning time longer. However, an aggressively short time will lower the overall learning time but could lead to less accurate learning of the application.

After the machine learning has been configured, the learning phase can be started. The pump must be running in Manual mode. Once running in Manual mode, select "Start auto learning phase". The machine learning wizard steps thru the process starting with an Overview Screen, which has the estimated time and says the following:

This process will automatically control the engine/motor speed while it learns the expected runtime values. Please ensure the setup is working as expected and the correct sensors and speed range are selected before starting. Starting a new learning process will remove the previous learned values The next screen is the Learning Status screen, which shows time remaining for the learning process. The Learning Status screen can be left to view gauges and other information as desired. Navigating back to the Start auto learning phase will then provide updated status information.

After the learning phase is complete, the Learning Results screen appears, which shows what inputs were learned and the details of the learning. During the learning phase, if there is no data, erratic data, or too constant (too small of range for the data) that input data will be discarded, and the status screen will show the input as Invalid. The screen will show the input as Disabled if that input is disabled in the settings menu.

Now that the application has been learned, each Input (see example list below) can be enabled or disabled in the Machine Learning Settings menu. The Warning and Fault thresholds can also be viewed. These thresholds are automatically determined during the learning phase. However, they can be individually changed in the settings menu as desired. Engine and VFD parameters may not be available on all engines or VFDs. If a particular parameter is not available, its lack of availability will automatically be recognized during the learning phase.

Machine Learning Inputs include the following examples: Flow, Suction, Discharge, Delta Pressure (Discharge minus Suction) across the pump; Engine Fuel Rate, Load (Torque); VFD Percent Load, Power Factor Angle, Output Current, and Torque. \

Finally, in the Machine Learning Settings menu, the Warning and Fault Alarms can be configured. Below is an example Warning Alarm menu with descriptions. The Shutdown Alarm menu may be similar.

Warning Alarm
Armed When—Selections (Never, Autostart, Manual Start, Always)
    The mode the panel must be in for the Alarm to be enabled.
Engine/Motor Condition—Selections (Running, Always, Stopped)
    The condition of the engine/motor must be in for the Alarm to be enabled.
Engine/Motor Stop—Selections (Ignore, Derate, Go To Run)
    What condition the engine/motor should go to when the Alarm happens.
Running Ignore Delay—(Seconds)
    Default is 60 seconds
    The number of seconds after the engine/motor starts running before the Alarm is enabled.
Enable Delay—(Seconds)
    Default is 30 seconds
    The number of seconds the Alarm condition must be true before the Alarm occurs.
    Example: If the Alarm condition occurs for only 10 seconds and this delay is set to 30 seconds, the Alarm will not occur.
Disable Delay—(Seconds)
    Default is 5 seconds
    The number of seconds the Alarm condition must remain False before the Alarm will be cancelled.
    Example: If the Alarm condition briefly goes False for 10 seconds and this delay is set to 30 seconds, the Alarm will not be cancelled.
Data Loss Fault—Selections (Off/On)
    If the panel detects the data for this input is lost or invalid, an alarm will occur if set to On.

Example: If the suction transducer is unplugged from the panel, an alarm will occur if set to On.

FIG. 10 is a table showing example icons that may be used with gauges on a control panel according to exemplary embodiments. The current machine learning status and values can be viewed on the gauges. The gauges are divided into five ranges. Green is the normal range. The gauge will show the parameter is as expected when its needle is pointing straight up (e.g., FIGS. 11 and 14, etc.). The needle will deviate to left as parameter is less than the normal. The needle will deviate to the right when the parameter is more than the normal (e.g., FIG. 12, etc.). As the parameter deviates more and more from the normal, the needle will cross over into the yellow region. If the needle remains in the region for more than the configured Warning Enable Delay (default is 30 seconds), a Warning Alarm will occur if enabled. If the needle continues to deviate even more, the needle will swing into the red region (e.g., FIG. 13, etc.). If it remains in the red region for more than the configured Shutdown Enable Delay (default is 30 seconds), a Shutdown Alarm will occur if enabled.

Figure 12:
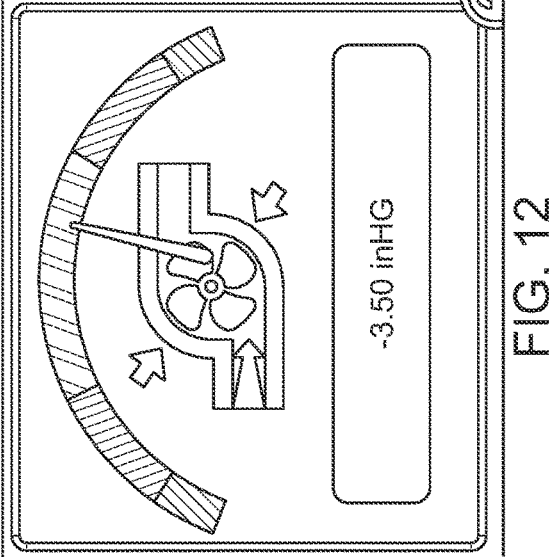
Figure 14:
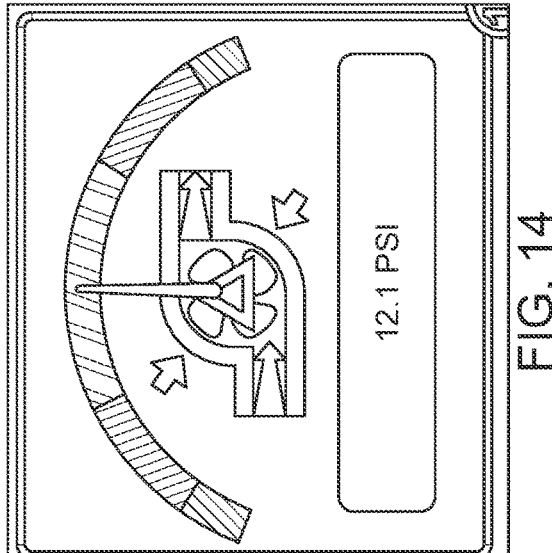
Figure 11:
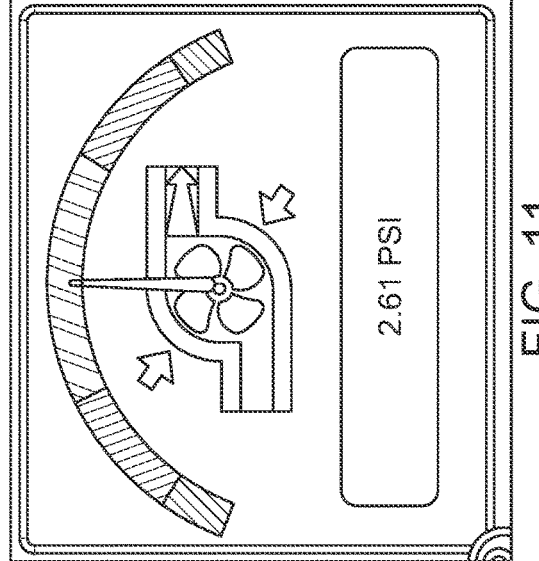
Figure 13:
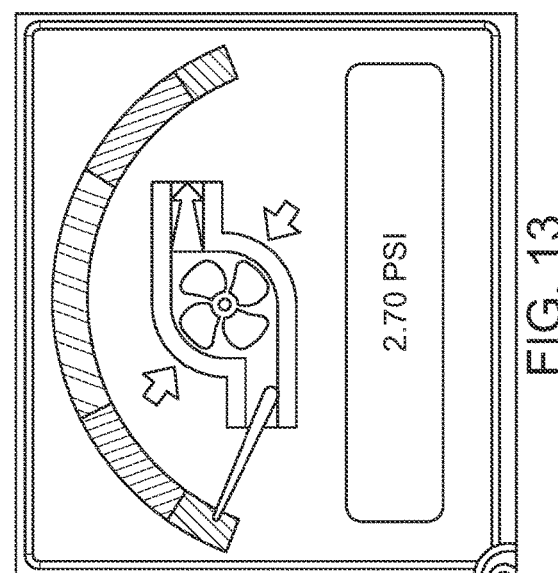

FIGS. 11, 12, 13, and 14 show icons that may be used on the gauges of a control panel according to exemplary embodiments. More specifically, FIG. 11 shows pump discharge of 2.61 PSI with the needle pointing straight up indicating that the pump discharge parameter being monitored is as expected. FIG. 12 shows a pump suction of −3.50 inHg (inch of mercury) with the needle having deviated to the right indicating that the pump suction parameter being monitored is more than the normal. FIG. 13 shows pump discharge of 2.70 PSI with the needle in the red region indicating a large deviation from normal. FIG. 15 shows a pump delta pressure of 12.1 PSI with the needle pointing straight up indicating that the pump discharge parameter being monitored is as expected.

By way of example, a controller disclosed herein (e.g., controller 104 (FIG. 1), controller 204 (FIG. 2), controllers 304A and 304B (FIG. 3), controller 404 (FIG. 4), etc.) may comprise a CANplus™ CP1000 control panel 904 (FIG. 9) that is configured to include or execute a machine learning process during which the control panel 904 learns (e.g., algorithmically learns via artificial intelligence (AI) machine learning algorithm(s), etc.) normal level(s) for parameter(s) based on or corresponding with acceptable range(s) (e.g., user-selected configurable positive/negative (+/−) percentage error threshold(s), etc.) across a full RPM operational range. With the machine learning, the control panel is configured with the ability to detect patterns, analyze data and troubleshoot issues, which may help to prevent downtime and costly repairs on pumps, etc.

Exemplary embodiments may include a control panel having one or more features identical to or similar to a CANplus™ CP1000 control panel. For example, an exemplary embodiment may include a control panel that is a manual and autostart platform for electronically governed diesel or natural gas engines. The control panel may also or instead be configured to control mechanically governed diesel engines. The control panel may comprise a comprehensive engine control panel with 21 inputs (5 for engine control and 16 for autostart operations). The control panel may support electronically and mechanically governed engines for manual or autostart operations. The control panel may be used for pump control applications to measure floats, suction and vacuum pressure, discharge pressure, water level and water flow. The control panel may support variable frequency drives. The control panel may include embedded Bluetooth® or LTE communications. The control panel may be configured to display graphical quad-gauge pages on a 4.3" diagonal WQVGA (480×272 pixels) liquid crystal display (LCD). The control panel may be configured to display SAE J1939 parameters reported by an ECU (Engine Control Unit), including, but not limited to the following: RPM, coolant temperature, oil pressure, engine hours, voltage, exhaust emissions system state and diagnostic codes. The backlit display of the control panel may be clearly readable in bright sunlight and total darkness and may be housed in a rugged IP66 rated housing. The control panel may include LEDs (e.g., three LEDs, etc.) to indicate Faults and Warnings, Emission-Related Alerts and Autostart active. The control panel may include display keys (e.g., five display keys, etc.) that are associated with a dynamic Display Key bar as well as control buttons (e.g., eight control buttons, etc.). The control panel may feature automatic start/stop control and start/stop modes using an Event Manager, which can start or stop based on any of the digital inputs, analog transducer inputs (e.g., six 4-20 mA analog transducer inputs, etc.), a real time clock, or combinations of date/time and analog or digital inputs. With the use of a transducer, the control panel may have a "cruise control" feature that automatically throttles the engine to maintain a configurable level. The control panel may be configured to use any one of the transducer inputs for the maintain/cruise control feature, regardless of whether that input is also being used as a start or stop event. The description in this paragraph of possible features that may be included with a control panel is provided for purpose of illustration and example only. In alternative exemplary embodiments, the control panel is configured differently, e.g., without one or more the feature(s) described in this paragraph, with different features and/or additional features than the features described in this paragraph, etc.

The exemplary embodiments of the controllers with machine learning disclosed herein (e.g., controller 104 (FIG. 1), controller 204 (FIG. 2), controllers 304A and 304B (FIG. 3), controller 404 (FIG. 4), etc.) may be used in various types of systems, including water supply systems, wastewater systems (e.g., a sewer system bypass, sewer lift station, etc.), flood water management systems, industrial pumps, generators, woodchippers, etc. But the exemplary controllers with machine learning disclosed herein may also be used in other systems and are not limited to use in any one particular type of system, motor, engine, or machine.

In exemplary embodiments, a controller is configured to be operable for controlling a system component. The controller is further configured to be operable for learning, via machine learning, a normal level for a parameter to be monitored across a full operational range of the system component, thereby enabling the controller to be operable for comparing the monitored parameter to the learned normal level for detecting an issue(s) or problem(s) associated with the monitored parameter within the full operational range of the system component.

In exemplary embodiments, the controller is further configured to: compare the monitored parameter to the learned normal level to determine whether the monitored parameter is within an acceptable range or error threshold; and generate an alert if the monitored parameter is determined to be outside the acceptable range or error threshold.

In exemplary embodiments, the controller is configured to algorithmically learn, via an artificial intelligence (AI) machine learning algorithm, the normal level for the parameter to be monitored across the full operational range of the system component.

In exemplary embodiments, the controller includes a user interface configured to allow one or more user inputs including selection of each parameter to be monitored and an error threshold for each selected parameter. And the controller is configured to compare each monitored parameter to its corresponding learned normal level to determine whether the monitored parameter is within its error threshold from the learned normal level.

In exemplary embodiments, the controller includes a user interface configured to allow a user input of a positive/negative (+/−) percentage error threshold for the parameter to be monitored. And the controller is configured to compare the monitored parameter to the learned normal level to determine whether the monitored parameter has deviated more than the positive/negative (+/−) percentage error threshold from the learned normal level.

In exemplary embodiments, the controller is configured to learn, via machine learning, a first learned profile for the parameter to be monitored during an initial set up of the system component and to thereafter learn, via machine learning, at least a second learned profile for the parameter to be monitored. And the controller is configured to compare the monitored parameter to the first learned profile and to at least the second learned profile for detecting an issue(s) or problem(s) associated with the monitored parameter. The controller is configured to compare the monitored parameter to the first learned profile and to at least the second learned profile to determine whether the monitored parameter is within an acceptable range or error threshold as defined by the first and second learned profiles. The controller may also be configured to generate an alert if the monitored parameter is determined to be outside the acceptable range or error threshold. The alert may indicate that maintenance is needed. The first learned profile may have a wider tolerance before a warning or fault is triggered while the second learned profile is useable for monitoring for smaller deviations. The monitored parameter may be fuel usage.

In exemplary embodiments, a system includes a controller as disclosed herein. The system also includes a pump and an engine configured to be operable for driving the pump. The controller is configured to be operable for controlling the engine. The controller is further configured to learn, via machine learning, normal flow level of the pump across the full operational range of the engine, whereby the controller is operable for comparing the monitored flow level of the pump to the learned normal flow level across the full operational range of the engine for detecting an issue(s) or problem(s) associated with the monitored flow level of the pump at any given RPM of the engine that is within the full operational range of the engine.

In exemplary embodiments, the controller is configured to: compare the monitored flow level of the pump to the learned normal flow level to determine whether the monitored flow level is within an acceptable range or error threshold at a specific RPM of the engine; and generate an alert if the monitored flow level is determined to be outside the acceptable range or error threshold at the specific RPM of the engine.

In exemplary embodiments, the controller includes a user interface configured to allow a user input of a positive/negative (+/−) percentage error threshold for the monitored flow level of the pump. And the controller is configured to compare the monitored flow level of the pump to the learned normal flow level to determine whether the monitored flow level has deviated more than the positive/negative (+/−) percentage error threshold from the learned normal flow level.

In exemplary embodiments, a system includes a controller as disclosed herein. The system also includes a pump, an electric motor configured to be operable for driving the pump, and a variable frequency drive (VFD) configured to be operable for controlling a speed of the electric motor. The controller is configured to be operable for controlling the variable frequency drive. The controller is further configured to learn, via machine learning, normal power consumption and torque levels of the electric motor across the full operational range of the electric motor, whereby the controller is operable for comparing the monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor.

In exemplary embodiments, the controller is configured to: compare the monitored power consumption and torque levels of the electric motor to the learned normal power consumption and torque levels to determine whether the monitored power consumption and torque levels are within an acceptable range or error threshold at a specific RPM of the electric motor; and generate an alert if the monitored power consumption and torque levels are determined to be outside the acceptable range or error threshold at the specific RPM of the electric motor.

In exemplary embodiments, the controller includes a user interface configured to allow a user input of a positive/negative (+/−) percentage error threshold for the power consumption and torque levels for the electric motor. And the controller is configured to compare the monitored power consumption and torque levels of the electric motor to the learned normal power consumption and torque levels to determine whether the monitored power consumption and torque levels have deviated more than the positive/negative (+/−) percentage error threshold from the learned normal power consumption and torque levels.

In exemplary embodiments, a system includes first and second controllers as disclosed herein. The system also includes a first pump, a second pump, an engine configured to be operable for driving the first pump, an electric motor configured to be operable for driving the second pump, and a variable frequency drive (VFD) configured to be operable for controlling a speed of the electric motor. The first controller is configured to be operable for controlling the engine. The first controller is further configured to learn, via machine learning, normal flow level of the pump across the full operational range of the engine, whereby the first controller is operable for comparing the monitored flow level of the pump to the learned normal flow level across the full operational range of the engine for detecting an issue(s) or problem(s) associated with the monitored flow level of the pump at any given RPM of the engine that is within the full operational range of the engine. The second controller is configured to be operable for controlling the variable frequency drive. The second controller is further configured to learn, via machine learning, normal power consumption and torque levels of the electric motor across the full operational range of the electric motor, whereby the second controller is operable for comparing the monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor.

In exemplary embodiments, the first controller is configured to compare the monitored flow level of the first pump to the learned normal flow level to determine whether the monitored flow level of the first pump is within an acceptable range or error threshold at a specific RPM of the engine, and to generate an alert if the monitored flow level of the first pump is determined to be outside the acceptable range or error threshold at the specific RPM of the engine.

In exemplary embodiments, the second controller is configured to compare the monitored power consumption and torque levels of the electric motor to the learned normal power consumption and torque levels to determine whether the monitored power consumption and torque levels is outside the learned normal power consumption and torque levels at a specific RPM of the electric motor, and generate an alert if the monitored power consumption and torque levels is determined to be outside the acceptable range or error threshold at the specific RPM of the electric motor.

In exemplary embodiments, the first controller includes a user interface configured to allow a user input of a positive/negative (+/−) percentage error threshold for the monitored flow level of the first pump. And the first controller is configured to compare the monitored flow level of the first pump to the learned normal flow level to determine whether the monitored flow level of the first pump has deviated more than the positive/negative (+/−) percentage error threshold from the learned normal flow level.

In exemplary embodiments, the second controller includes a user interface configured to allow a user input of a positive/negative (+/−) percentage error threshold for the power consumption and torque levels for the electric motor. And the second controller is configured to compare the monitored power consumption and torque levels of the electric motor to the learned normal power consumption and torque levels to determine whether the monitored power consumption and torque levels have deviated more than the positive/negative (+/−) percentage error threshold from the learned normal power consumption and torque levels.

In exemplary embodiments, a system includes a controller as disclosed herein. The system also includes a first pump, a second pump, an engine configured to be operable for driving the first pump, an electric motor configured to be operable for driving the second pump, and a variable frequency drive (VFD) configured to be operable for controlling a speed of the electric motor. The controller is configured to be operable for controlling the engine and for controlling the variable frequency drive. The controller is further configured to learn, via machine learning, learn, via machine learning, normal flow level of the first pump across the full operational range of the engine, whereby the controller is operable for comparing the monitored flow level of the first pump to the learned normal flow level across the full operational range of the engine for detecting an issue(s) or problem(s) associated with the monitored flow level of the first pump at any given RPM of the engine that is within the full operational range of the engine. The controller is also configured to learn, via machine learning, normal power consumption and torque levels of the electric motor across the full operational range of the electric motor, whereby the controller is operable for comparing the monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor.

In exemplary embodiments, the controller is configured to compare the monitored flow level of the first pump to the learned normal flow level to determine whether the monitored flow level of the first pump is within an acceptable range or error threshold at a specific RPM of the engine, and to generate an alert if the monitored flow level of the first pump is determined to be outside the acceptable range or error threshold at the specific RPM of the engine.

In exemplary embodiments, the controller is configured to compare the monitored power consumption and torque levels of the electric motor to the learned normal power consumption and torque levels to determine whether the monitored power consumption and torque levels is outside the learned normal power consumption and torque levels at a specific RPM of the electric motor, and generate an alert if the monitored power consumption and torque levels is determined to be outside the acceptable range or error threshold at the specific RPM of the electric motor.

In exemplary embodiments, the controller includes a user interface configured to allow a user input of a positive/negative (+/−) percentage error threshold for the monitored flow level of the first pump. And the controller is configured to compare the monitored flow level of the first pump to the learned normal flow level to determine whether the monitored flow level of the first pump has deviated more than the positive/negative (+/−) percentage error threshold from the learned normal flow level.

In exemplary embodiments, the controller includes a user interface configured to allow a user input of a positive/negative (+/−) percentage error threshold for the power consumption and torque levels for the electric motor. And the controller is configured to compare the monitored power consumption and torque levels of the electric motor to the learned normal power consumption and torque levels to determine whether the monitored power consumption and torque levels have deviated more than the positive/negative (+/−) percentage error threshold from the learned normal power consumption and torque levels.

In exemplary embodiments, a method includes machine learning, via a controller, a normal level for a parameter to be monitored across a full operational range of a system component controllable by the controller; monitoring, via the controller, the parameter; comparing, via the controller, the monitored parameter to the learned normal level to determine whether the monitored parameter is within an acceptable range or error threshold; and generating, via the controller, an alert if the monitored parameter is determined to be outside the acceptable range or error threshold.

In exemplary embodiments of the method, the machine learning, via the controller, includes the controller algorithmically learning, via an artificial intelligence (AI) machine learning algorithm, the normal level for the parameter to be monitored across the full operational range of the system component.

In exemplary embodiments, the method includes: allowing a user to select each parameter to be monitored and an error threshold for each selected parameter; and comparing, via the controller, each monitored parameter to the corresponding learned normal level to determine whether the monitored parameter is within its error threshold from the corresponding learned normal level.

In exemplary embodiments, the method includes: allowing a user to select a positive/negative (+/−) percentage error threshold for the parameter to monitored; comparing, via the controller, the monitored parameter to the learned normal level to determine whether the monitored parameter has deviated more than the positive/negative (+/−) percentage error threshold from the learned normal level; and generating, via the controller, an alert if the monitored parameter is determined to have deviated more than the positive/negative (+/−) percentage error threshold from the learned normal level.

In exemplary embodiments, the method includes machine learning, via the controller, a first learned profile for the parameter to be monitored during an initial set up of the system component and to thereafter learn, via machine learning, at least a second learned profile for the parameter to be monitored. The method also includes comparing, via the controller, the monitored parameter to the first learned profile and to at least the second learned profile to determine whether the monitored parameter is within an acceptable range or error threshold. The method may further include generating, via the controller, the alert if the monitored parameter is determined to be outside the acceptable range or error threshold, whereby the alert may indicate that maintenance is needed. The first learned profile may have a wider tolerance before a warning or fault is triggered while the second learned profile is useable for monitoring for smaller deviations. The monitored parameter may be fuel usage.

In exemplary embodiments of the method, the system component comprises an engine or a motor controllable by the controller. And the method includes: machine learning, via the controller, the normal level for the parameter to be monitored across a full operational range of the engine or motor; comparing, via the controller, the monitored parameter to the learned normal level to determine whether the monitored parameter is within an acceptable range or error threshold at a specific RPM of the engine or motor; and generating, via the controller, an alert if the monitored parameter is determined to be outside the acceptable range or error threshold at the specific RPM of the engine or motor.

In exemplary embodiments of the method, machine learning, via the controller, includes the controller algorithmically learning, via an artificial intelligence (AI) machine learning algorithm, the normal level for the parameter to be monitored across the full operational range of the engine or motor.

In exemplary embodiments of the method, the controller is configured to be operable for controlling an engine for driving a pump. The parameter to be monitored includes flow level of the pump. And the method includes: machine learning, via the controller, normal flow level of the pump across the full operational range of the engine; monitoring, via the controller, the flow level of the pump; comparing, via the controller, the monitored flow level to the learned normal flow level to determine whether the monitored flow level is within an acceptable range or error threshold at a specific RPM of the engine; and generating, via the controller, an alert if the monitored flow level is determined to be outside the acceptable range or error threshold at the specific RPM of the engine.

In exemplary embodiments of the method, the controller is configured to be operable for controlling a variable frequency drive and an electric motor for driving a pump. The parameter to be monitored includes power consumption and torque of the electric motor. And the method includes: machine learning, via the controller, normal power consumption and torque levels of the electric motor across the full operational range of the electric motor; monitoring, via the controller, the power consumption and torque of the electric motor; comparing, via the controller, the monitored power consumption and torque to the learned normal power consumption and torque levels to determine whether the monitored power consumption and torque levels is outside an acceptable range or error threshold at a specific RPM of the electric motor; and generating, via the controller, an alert if the monitored power consumption and torque is determined to be outside the acceptable range or error threshold at the specific RPM of the engine.

In exemplary embodiments, a non-transitory computer-readable storage media includes executable instructions, that when executed by at least one processor, cause a controller to learn, via machine learning, a normal level for a parameter to be monitored across a full operational range of a system component, thereby enabling the controller to be operable for comparing the monitored parameter to the learned normal level for detecting an issue(s) or problem(s) associated with the monitored parameter within the full operational range of the system component.

In exemplary embodiments, the executable instructions include executable instructions, that when executed by the at least one processor, cause the controller to: compare the monitored parameter to the learned normal level to determine whether the monitored parameter is within an acceptable range or error threshold; and generate an alert if the monitored parameter is determined to be outside the acceptable range or error threshold.

In exemplary embodiments, the executable instructions include executable instructions, that when executed by the at least one processor, cause the controller to algorithmically learn, via an artificial intelligence (AI) machine learning algorithm, the normal level for the parameter to be monitored across the full operational range of the system component.

In exemplary embodiments, the executable instructions include executable instructions, that when executed by the at least one processor, cause the controller to learn, via machine learning, a normal level for each parameter to be monitored across the full operational range of the system component based on or corresponding with one or more user inputs including selection of each parameter to be monitored and an error threshold for each selected parameter.

In exemplary embodiments, the executable instructions include executable instructions, that when executed by the at least one processor, cause the controller to compare the monitored parameter to the learned normal level to determine whether the monitored parameter has deviated more than a positive/negative (+/−) percentage error threshold from the learned normal level.

In exemplary embodiments, the executable instructions include executable instructions, that when executed by the at least one processor, cause the controller to: learn, via machine learning, a first learned profile for the parameter to be monitored during an initial set up of the system component and to thereafter learn, via machine learning, at least a second learned profile for the parameter to be monitored; and compare the monitored parameter to the first learned profile and to at least the second learned profile for detecting an issue(s) or problem(s) associated with the monitored parameter. The executable instructions may further include executable instructions, that when executed by the at least one processor, cause the controller to: compare the monitored parameter to the first learned profile and to at least the second learned profile to determine whether the monitored parameter is within an acceptable range or error threshold as defined by the first and second learned profiles; and generate an alert if the monitored parameter is determined to be outside the acceptable range or error threshold. The alert may indicate that maintenance is needed. The first learned profile may have a wider tolerance before a warning or fault is triggered while the second learned profile is useable for monitoring for smaller deviations. The monitored parameter may be fuel usage.

In exemplary embodiments, the system component comprises an engine or motor. The controller is configured to be operable for controlling the engine or motor. And the executable instructions include executable instructions, that when executed by the at least one processor, cause the controller to learn, via machine learning, the normal level for the parameter to be monitored across the full operational range of the engine or motor, thereby enabling the controller to be operable for comparing the monitored parameter to the learned normal level across the full operational range of the engine or motor for detecting an issue(s) or problem(s) associated with the monitored parameter at any given RPM of the engine or motor that is within the full operational range of the engine or motor.

In exemplary embodiments, the executable instructions include executable instructions, that when executed by the at least one processor, cause the controller to: compare the monitored parameter to the learned normal level to determine whether the monitored parameter is within an acceptable level or error threshold at a specific RPM of the engine or motor; and generate an alert if the monitored parameter is determined to be outside the acceptable level or error threshold at the specific RPM of the engine.

In exemplary embodiments, the executable instructions include executable instructions, that when executed by the at least one processor, cause the controller to: compare the compare the monitored parameter to the learned normal level to determine whether the monitored parameter has deviated more than a positive/negative (+/−) percentage error threshold from the learned normal level at a specific RPM of the engine or motor; and generate an alert if the monitored parameter is determined to have deviated more than the positive/negative (+/−) percentage error threshold at the specific RPM of the engine or motor.

In exemplary embodiments, the controller is configured to be operable for controlling an engine for driving a pump. The parameter to be monitored is flow level of the pump. And the executable instructions include executable instructions, that when executed by the at least one processor, cause the controller to learn, via machine learning, normal flow level of the pump across the full operational range of the engine, whereby the controller is operable for comparing the monitored flow level of the pump to the learned normal flow level across the full operational range of the engine for detecting an issue(s) or problem(s) associated with the monitored flow level of the pump at any given RPM of the engine that is within the full operational range of the engine.

In exemplary embodiments, the controller is configured to be operable for controlling a variable frequency drive and an electric motor for driving a pump. The parameter to be monitored is power consumption and torque of the electric motor. And the executable instructions include executable instructions, that when executed by the at least one processor, cause the controller to learn, via machine learning, normal power consumption and torque levels of the electric motor across the full operational range of the electric motor, whereby the controller is operable for comparing the monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor.

In exemplary embodiments, a controller includes the non-transitory computer-readable storage media including executable instructions as disclosed herein. The controller also includes at least one processor for executing the instructions of the non-transitory computer-readable storage media.

In exemplary embodiments, a system includes a controller, non-transitory computer-readable storage media, and at least one processor. The system also includes a pump and an engine configured to be operable for driving the pump. The controller is configured to be operable for controlling the engine. The non-transitory computer-readable storage media includes executable instructions, that when executed by the at least one processor, cause the controller to learn, via machine learning, normal flow level of the pump across the full operational range of the engine, whereby the controller is operable for comparing monitored flow level of the pump to the learned normal flow level across the full operational range of the engine for detecting an issue(s) or problem(s) associated with the monitored flow level of the pump at any given RPM of the engine that is within the full operational range of the engine.

In exemplary embodiments, a system includes a controller, non-transitory computer-readable storage media, and at least one processor. The system also includes a pump, an electric motor configured to be operable for driving the pump, and a variable frequency drive (VFD) configured to be operable for controlling a speed of the electric motor. The controller is configured to be operable for controlling the variable frequency drive. The non-transitory computer-readable storage media includes executable instructions, that when executed by the at least one processor, cause the controller to learn, via machine learning, normal power consumption and torque levels of the electric motor across the full operational range of the electric motor, whereby the controller is operable for comparing monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor.

In exemplary embodiments, a system includes first and second controllers, non-transitory computer-readable storage media, and at least one processor. The system also includes a first pump, a second pump, an engine configured to be operable for driving the first pump, an electric motor configured to be operable for driving the second pump, and a variable frequency drive (VFD) configured to be operable for controlling a speed of the electric motor. The first controller is configured to be operable for controlling the engine. The second controller is configured to be operable for controlling the variable frequency drive. The non-transitory computer-readable storage media includes executable instructions, that when executed by the at least one processor, cause: the first controller to learn, via machine learning, normal flow level of the pump across the full operational range of the engine, whereby the first controller is operable for comparing monitored flow level of the pump to the learned normal flow level across the full operational range of the engine for detecting an issue(s) or problem(s) associated with the monitored flow level of the pump at any given RPM of the engine that is within the full operational range of the engine; and the second controller to learn, via machine learning, normal power consumption and torque levels of the electric motor across the full operational range of the electric motor, whereby the second controller is operable for comparing monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor.

In exemplary embodiments, a system includes a controller, non-transitory computer-readable storage media, and at least one processor. The system also includes a first pump, a second pump, an engine configured to be operable for driving the first pump, an electric motor configured to be operable for driving the second pump, and a variable frequency drive (VFD) configured to be operable for controlling a speed of the electric motor. The controller is configured to be operable for controlling the engine and for controlling the variable frequency drive. The non-transitory computer-readable storage media includes executable instructions, that when executed by the at least one processor, cause the controller to: learn, via machine learning, normal flow level of the first pump across the full operational range of the engine, whereby the controller is operable for comparing monitored flow level of the first pump to the learned normal flow level across the full operational range of the engine for detecting an issue(s) or problem(s) associated with the monitored flow level of the first pump at any given RPM of the engine that is within the full operational range of the engine; and learn, via machine learning, normal power consumption and torque levels of the electric motor across the full operational range of the electric motor, whereby the controller is operable for comparing monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor.

As will be appreciated based on the foregoing specification, the above-described embodiments of the disclosure may be implemented using computer programming or engineering techniques including computer software, firmware, hardware, or any combination or subset thereof, wherein the technical effect may be achieved by performing the following operations: a controller learning, via machine learning, an acceptable level for a parameter to be monitored across a full operational range of the system component, thereby enabling the controller to be operable for detecting an issue(s) or problem(s) associated with the monitored parameter within the full operational range of a system component.

Exemplary embodiments may include one or more processors and memory coupled to (and in communication with) the one or more processors. A processor may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

It should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, other optical disk storage, magnetic disk storage or other magnetic storage devices, any other type of volatile or nonvolatile physical or tangible computer-readable media, or other medium that can be used to carry or store desired program code in the form of instructions or data structures and that can be accessed by a computer. Combinations of the above should also be included within the scope of computer-readable media.

Computer-executable instructions may be stored in the memory for execution by a processor to particularly cause the processor to perform one or more of the functions described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the functions or processes described herein.

It should also be appreciated that one or more aspects of the present disclosure transform a general-purpose computing device into a special-purpose computing device when configured to perform the functions, methods, and/or processes described herein.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a pump;
an engine configured to be operable for driving the pump; and
a controller is configured to be operable for controlling the engine, the controller further configured to learn, via machine learning, normal flow level of the pump across a full operational range of the engine, whereby the controller is operable for comparing a monitored flow level of the pump to the learned normal flow level across the full operational range of the engine for detecting an issue(s) or problem(s) associated with the monitored flow level of the pump at any given RPM of the engine that is within the full operational range of the engine;
wherein the controller is configured to generate an alert and/or initiate a shutdown when the comparison of the monitored flow level of the pump to the learned normal flow level indicates an issue(s) or problem(s) associated with the monitored flow level of the pump.

2. The system of claim 1, wherein the controller is configured to:
compare the monitored flow level of the pump to the learned normal flow level to determine whether the monitored parameter is within an acceptable range or error threshold; and
generate an alert if the monitored flow level of the pump is determined to be outside the acceptable range or error threshold.

3. The system of claim 1, wherein the controller is configured to algorithmically learn, via an artificial intelligence (AI) machine learning algorithm, the normal flow level of the pump across the full operational range of the engine.

4. The system of claim 1, wherein:
the controller includes a user interface configured to allow one or more user inputs including an error threshold for the monitored flow level of the pump; and
the controller is configured to compare the monitored flow level of the pump to the learned normal flow level to determine whether the monitored flow level is within its error threshold from the learned normal flow level.

5. The system of claim 1, wherein:
the controller is configured to learn, via machine learning, a first learned profile for the flow level of the pump during an initial set up of the engine and to thereafter learn, via machine learning, at least a second learned profile for the flow level of the pump; and

the controller is configured to compare the monitored flow level of the pump to the first learned profile and to at least the second learned profile for detecting an issue(s) or problem(s) associated with the monitored flow level of the pump.

6. The system of claim 5, wherein:
the controller is configured to compare the monitored flow level of the pump to the first learned profile and to at least the second learned profile to determine whether the monitored flow level of the pump is within an acceptable range or error threshold as defined by the first and second learned profiles; and
generate an alert if the monitored flow level of the pump is determined to be outside the acceptable range or error threshold, whereby the alert may indicate that maintenance is needed.

7. The system of claim 5, wherein the first learned profile has a wider tolerance before a warning or fault is triggered while the second learned profile is useable for monitoring for smaller deviations.

8. The system of claim 1, wherein the controller is configured to learn, via machine learning, suction pressure on an input side of a pump at a particular tank level as measured by a level transducer and to thereafter perform secondary processing to adjust a normal suction pressure on the input side of the pump that will vary with changes in the tank level.

9. The system of claim 1, wherein the controller is configured to:
compare the monitored flow level of the pump to the learned normal flow level to determine whether the monitored flow level is within an acceptable range or error threshold at a specific RPM of the engine; and
generate an alert if the monitored flow level is determined to be outside the acceptable range or error threshold at the specific RPM of the engine.

10. The system of claim 1, wherein:
the controller includes a user interface configured to allow a user input of a positive/negative (+/−) percentage error threshold for the monitored flow level of the pump; and
the controller is configured to compare the monitored flow level of the pump to the learned normal flow level to determine whether the monitored flow level has deviated more than the positive/negative (+/−) percentage error threshold from the learned normal flow level.

11. A system comprising:
a pump;
an electric motor configured to be operable for driving the pump;
a variable frequency drive (VFD) configured to be operable for controlling a speed of the electric motor; and
a controller configured to be operable for controlling the variable frequency drive, the controller further configured to learn, via machine learning, normal power consumption and torque levels of the electric motor across a full operational range of the electric motor, whereby the controller is operable for comparing monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor;

32 wherein the controller is configured to generate an alert and/or initiate a shutdown when the comparison of the monitored power consumption and torque levels of the electric motor to the learned normal power consumption and torque levels indicates an issue(s) or problem(s) associated with the monitored power consumption and torque levels of the electric motor.

12. The system of claim 11, wherein the controller is configured to:
compare the monitored power consumption and torque levels of the electric motor to the learned normal power consumption and torque levels to determine whether the monitored power consumption and torque levels are within an acceptable range or error threshold at a specific RPM of the electric motor; and
generate an alert if the monitored power consumption and torque levels are determined to be outside the acceptable range or error threshold at the specific RPM of the electric motor.

13. The system of claim 11, wherein:
the controller includes a user interface configured to allow a user input of a positive/negative (+/−) percentage error threshold for the power consumption and torque levels for the electric motor; and
the controller is configured to compare the monitored power consumption and torque levels of the electric motor to the learned normal power consumption and torque levels to determine whether the monitored power consumption and torque levels have deviated more than the positive/negative (+/−) percentage error threshold from the learned normal power consumption and torque levels.

14. A system comprising:
a first pump;
a second pump;
an engine configured to be operable for driving the first pump;
an electric motor configured to be operable for driving the second pump;
a variable frequency drive (VFD) configured to be operable for controlling a speed of the electric motor;
a first controller configured to be operable for controlling the engine, the first controller further configured to learn, via machine learning, normal flow level of the pump across a full operational range of the engine, whereby the first controller is operable for comparing a monitored flow level of the first pump to the learned normal flow level across the full operational range of the engine for detecting an issue(s) or problem(s) associated with the monitored flow level of the first pump at any given RPM of the engine that is within the full operational range of the engine, wherein the first controller is configured to generate an alert and/or initiate a shutdown when the comparison of the monitored flow level of the first pump to the learned normal flow level indicates an issue(s) or problem(s) associated with the monitored flow level of the first pump; and
a second controller configured to be operable for controlling the variable frequency drive, the second controller further configured to learn, via machine learning, normal power consumption and torque levels of the electric motor across a full operational range of the electric motor, whereby the second controller is operable for comparing monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor, wherein the second controller is configured to generate an alert and/or initiate a shutdown when the comparison of the monitored power consumption and torque levels of the electric motor to the learned normal power consumption and torque levels indicates an issue(s) or problem (s) associated with the monitored power consumption and torque levels of the electric motor.

15. The system of claim 14:
wherein the first controller is configured to compare the monitored flow level of the first pump to the learned normal flow level to determine whether the monitored flow level of the first pump is within an acceptable range or error threshold at a specific RPM of the engine, and to generate an alert if the monitored flow level of the first pump is determined to be outside the acceptable range or error threshold at the specific RPM of the engine; and/or
wherein the second controller is configured to compare the monitored power consumption and torque levels of the electric motor to the learned normal power consumption and torque levels to determine whether the monitored power consumption and torque levels is outside the learned normal power consumption and torque levels at a specific RPM of the electric motor, and generate an alert if the monitored power consumption and torque levels is determined to be outside the acceptable range or error threshold at the specific RPM of the electric motor.

16. The system of claim 14:
wherein the first controller includes a user interface configured to allow a user input of a positive/negative (+/−) percentage error threshold for the monitored flow level of the first pump, and the first controller is configured to compare the monitored flow level of the first pump to the learned normal flow level to determine whether the monitored flow level of the first pump has deviated more than the positive/negative (+/−) percentage error threshold from the learned normal flow level; and/or
wherein the second controller includes a user interface configured to allow a user input of a positive/negative (+/−) percentage error threshold for the power consumption and torque levels for the electric motor, and the second controller is configured to compare the monitored power consumption and torque levels of the electric motor to the learned normal power consumption and torque levels to determine whether the monitored power consumption and torque levels have deviated more than the positive/negative (+/−) percentage error threshold from the learned normal power consumption and torque levels.

17. A system comprising:
a first pump;
a second pump;
an engine configured to be operable for driving the first pump;
an electric motor configured to be operable for driving the second pump;
a variable frequency drive (VFD) configured to be operable for controlling a speed of the electric motor; and
a controller configured to be operable for controlling the engine and for controlling the variable frequency drive, the controller further configured to:

learn, via machine learning, normal flow level of the first pump across a full operational range of the engine, whereby the controller is operable for comparing a monitored flow level of the first pump to the learned normal flow level across the full operational range of the engine for detecting an issue(s) or problem(s) associated with the monitored flow level of the first pump at any given RPM of the engine that is within the full operational range of the engine, wherein the controller is configured to generate an alert and/or initiate a shutdown when the comparison of the monitored flow level of the first pump to the learned normal flow level indicates an issue(s) or problem(s) associated with the monitored flow level of the first pump; and
learn, via machine learning, normal power consumption and torque levels of the electric motor across a full operational range of the electric motor, whereby the controller is operable for comparing monitored power consumption and torque levels of the electric motor to the learned normal power consumption and torque levels across the full operational range of the electric motor for detecting an issue(s) or problem(s) associated with the monitored power consumption and torque levels at any given RPM of the electric motor that is within the full operational range of the electric motor, wherein the controller is configured to generate an alert and/or initiate a shutdown when the comparison of the monitored power consumption and torque levels of the electric motor to the learned normal power consumption and torque levels indicates an issue(s) or problem(s) associated with the monitored power consumption and torque levels of the electric motor.

18. The system of claim 17, wherein the controller is configured to:
compare the monitored flow level of the first pump to the learned normal flow level to determine whether the monitored flow level of the first pump is within an acceptable range or error threshold at a specific RPM of the engine, and to generate an alert if the monitored flow level of the first pump is determined to be outside the acceptable range or error threshold at the specific RPM of the engine; and/or
compare the monitored power consumption and torque levels of the electric motor to the learned normal power consumption and torque levels to determine whether the monitored power consumption and torque levels is outside the learned normal power consumption and torque levels at a specific RPM of the electric motor, and generate an alert if the monitored power consumption and torque levels is determined to be outside the acceptable range or error threshold at the specific RPM of the electric motor.

19. The system of claim 17, wherein:
the controller includes a user interface configured to allow a user input of a positive/negative (+/−) percentage error threshold for the monitored flow level of the first pump, and the controller is configured to compare the monitored flow level of the first pump to the learned normal flow level to determine whether the monitored flow level of the first pump has deviated more than the positive/negative (+/−) percentage error threshold from the learned normal flow level; and/or
the controller includes a user interface configured to allow a user input of a positive/negative (+/−) percentage error threshold for the power consumption and torque levels for the electric motor, and the controller is configured to compare the monitored power consumption and torque levels of the electric motor to the learned normal power consumption and torque levels to determine whether the monitored power consumption and torque levels have deviated more than the positive/negative (+/−) percentage error threshold from the learned normal power consumption and torque levels.

20. A method comprising:

machine learning, via a controller, normal flow level of a pump across a full operational range of an engine, the controller is configured to be operable for controlling the engine for driving a pump;

monitoring, via the controller, a flow level of the pump;

comparing, via the controller, the monitored flow level to the learned normal flow level to determine whether the monitored flow level is within an acceptable range or error threshold at a specific RPM of the engine; and generating, via the controller, an alert and/or initiating a shutdown, via the controller, if the monitored flow level is determined to be outside the acceptable range or error threshold at the specific RPM of the engine.

21. The method of claim 20, wherein machine learning, via the controller, includes the controller algorithmically learning, via an artificial intelligence (AI) machine learning algorithm, the normal flow level of the pump across the full operational range of the engine.

22. The method of claim 20, wherein the method includes:

allowing a user to select a positive/negative (+/−) percentage error threshold for the flow level of the pump;

comparing, via the controller, the monitored flow level to the learned normal flow level to determine whether the monitored flow level has deviated more than the positive/negative (+/−) percentage error threshold from the learned normal flow level; and generating, via the controller, an alert if the monitored flow level is determined to have deviated more than the positive/negative (+/−) percentage error threshold from the learned normal flow level.

23. The method of claim 20, wherein the method includes machine learning, via the controller, a first learned profile for the flow level of the pump during an initial set up of the engine and to thereafter learn, via machine learning, at least a second learned profile for the flow level of the pump.

24. The method of claim 23, wherein the method includes:

comparing, via the controller, the monitored flow level to the first learned profile and to at least the second learned profile to determine whether the monitored flow level is within an acceptable range or error threshold; and generating, via the controller, the alert if the monitored flow level is determined to be outside the acceptable range or error threshold, whereby the alert may indicate that maintenance is needed.

25. The method of claim 23, wherein the first learned profile has a wider tolerance before a warning or fault is triggered while the second learned profile is useable for monitoring for smaller deviation.

26. A method comprising:

machine learning, via a controller, normal power consumption and torque levels of an electric motor across a full operational range of the electric motor, the controller configured to be operable for controlling a variable frequency drive and the electric motor for driving a pump;

monitoring, via the controller, power consumption and torque of the electric motor;

comparing, via the controller, the monitored power consumption and torque to the learned normal power consumption and torque levels to determine whether the monitored power consumption and torque levels is outside an acceptable range or error threshold at a specific RPM of the electric motor; and generating, via the controller, an alert and/or initiating a shutdown, via the controller, if the monitored power consumption and torque is determined to be outside the acceptable range or error threshold at the specific RPM of the engine.

* * * * *